United States Patent [19]

Willen et al.

[11] Patent Number: 5,995,904
[45] Date of Patent: Nov. 30, 1999

[54] METHOD FOR FREQUENCY DOMAIN SEISMIC DATA PROCESSING ON A MASSIVELY PARALLEL COMPUTER

[75] Inventors: Dennis E. Willen; Louis J. Maher, both of Houston, Tex.

[73] Assignee: Exxon Production Research Company, Houston, Tex.

[21] Appl. No.: 08/793,779

[22] PCT Filed: Jun. 13, 1996

[86] PCT No.: PCT/US96/10276

§ 371 Date: Dec. 12, 1997

§ 102(e) Date: Dec. 12, 1997

[87] PCT Pub. No.: WO97/00485

PCT Pub. Date: Jan. 3, 1997

[51] Int. Cl.[6] .................................................. G06F 19/00
[52] U.S. Cl. .............................................................. 702/14
[58] Field of Search .............................. 702/14, 16, 17, 702/18

[56] References Cited

U.S. PATENT DOCUMENTS

| | | | |
|---|---|---|---|
| H482 | 6/1988 | Berryhill et al. | 367/38 |
| 4,516,206 | 5/1985 | McEvilly | 364/421 |
| 4,742,497 | 5/1988 | Beasley et al. | 367/52 |
| 4,841,490 | 6/1989 | Carron | 367/38 |
| 5,111,399 | 5/1992 | Armitage | 364/421 |
| 5,198,979 | 3/1993 | Moorhead et al. | 364/421 |
| 5,349,527 | 9/1994 | Plaprzak et al. | 364/421 |
| 5,394,325 | 2/1995 | Schneider, Jr. | 364/421 |
| 5,404,296 | 4/1995 | Moorhead | 364/421 |

FOREIGN PATENT DOCUMENTS

WO 93/13434 12/1992 WIPO .

OTHER PUBLICATIONS

Li, Zhiming, *Compensating finite–difference errors in 3–D migration and modeling*, Geophysics, vol. 56, No. 10, (Oct.); P.1650–166.

Brown, David L., *Applications of operator separation in reflection seismology*, Geophysics, vol. 48, No. 3 (Mar. 1983), P. 288–294.

Kim, Y. C. et al., *Recursive wavenumber–frequency migration*, Geophysics, vol. 54, No. 3 (Mar. 1989), P. 319–329.

Versteeg, Roelof J., et al., *Shot level parallelization of a seismic inversion code using* PVM, Society of Exploration Geophysicists, 1994.

Gazdag, Jeno, *Wave Equation migration with the phase–shift method*, Geophysics, vol. 43, No. (Dec. 1978), P. 1342–1351.

Gazdag, Jeno, et al., *Migration of seismic data by phase shift plus interpolation*, Geophysics, vol., 49, No. 2 (Feb. 1984), P. 124–131.

Tong, Chen, *Network Parallel 3–D Phase–Shift Migration*, Society of Exploration Geophysicist 1994.

Kapotas, Sotiris S., *Three–Dimensional Imaging of Reflection Seismic Wavefields Using Parallel Computers*, Dissertation, Degree 1991, UMI Dissertation Services, P. 1–226.

*Primary Examiner*—Donald E. McElheny, Jr.
*Attorney, Agent, or Firm*—S. P. Koch; F. E. Reid

[57] ABSTRACT

A frequency domain method of processing geophysical data on a computer having massively parallel processors. The method involves assigning data slice partitions to each processor, precomputing a velocity model corresponding to the geophysical data, and migrating the data on each slice within each processor using a one-pass, split wave equation finite difference technique for depth migration and either phase shift or recursive techniques for time migration. A sequence of transforms and transpositions between processors assigned partitions on each frequency slice transforms into the frequency-wavenumber domain and allows the migration calculations to be directly performed by each processor to be independent of each other processor. The transforms and transposes also allow for depth migration error correction and filtering in the frequency-wavenumber domain.

11 Claims, 13 Drawing Sheets

Velocity slices    Frequency slices

METHOD FOR FREQUENCY DOMAIN SEISMIC DATA PROCESSING ON A MASSIVELY PARALLEL COMPUTER

FIELD OF THE INVENTION

This invention relates to the field of geophysical prospecting. Specifically, the invention involves a frequency domain method of processing seismic data using parallel processors.

BACKGROUND OF THE INVENTION

The search for subsurface hydrocarbon deposits typically involves a sequence of data acquisition, analysis, and interpretation procedures. The data acquisition phase involves use of an energy source to generate signals that propagate into the earth and reflect from various subsurface geologic structures. The reflected signals are recorded by a multitude of receivers on or near the surface of the earth, or in an overlying body of water. The received signals, which are often referred to as seismic traces, consist of amplitudes of acoustic energy which vary as a function of time, receiver position, and source position and, most importantly, vary as a function of the physical properties of the structures from which the signals reflect. The data analyst uses these traces along with a geophysical model to develop an image of the subsurface geologic structures.

The analysis phase involves procedures that vary depending on the nature of the geological structure being investigated, and on the characteristics of the dataset itself. In general, however, the purpose of a typical seismic data processing effort is to produce an image of the geologic structure from the recorded data. That image is developed using theoretical and empirical models of the manner in which the signals are transmitted into the earth, attenuated by the subsurface strata, and reflected from the geologic structures. The quality of the final product of the data processing sequence is heavily dependent on the accuracy of these analysis procedures.

The final phase is the interpretation of the analytic results. Specifically, the interpreter's task is to assess the extent to which subsurface hydrocarbon deposits are present, thereby aiding such decisions as whether additional exploratory drilling is warranted or what an optimum hydrocarbon recovery scenario may be. In that assessment, the interpretation of the image involves a variety of different efforts. For example, the interpreter often studies the imaged results to obtain an understanding of the regional subsurface geology. This may involve marking main structural features, such as faults, synclines and anticlines. Thereafter, a preliminary contouring of horizons may be performed. A subsequent step of continuously tracking horizons across the various vertical sections, with correlations of the interpreted faults, may also occur. As is clearly understood in the art, the quality and accuracy of the results of the data analysis step of the seismic sequence have a significant impact on the accuracy and usefulness of the results of this interpretation phase.

In principle, the seismic image can be developed using a three-dimensional geophysical model of seismic wave propagation, thereby facilitating accurate depth and azimuthal scaling of all reflections in the data. Accurately specified reflections greatly simplify data interpretation, since the interpretational focus can be on the nature of the geologic structure involved and not on the accuracy of the image. Unfortunately, three dimensional geophysical models frequently require intolerably long computation times, and seismic analysts are forced to simplify the data processing effort as much as possible to reduce the burdens of both analysis time and cost.

In addition to the 3-D computation challenge, the analyst faces a processing volume challenge. For example, a typical data acquisition exercise may involve hundreds to hundreds of thousands of source locations, with each source location having hundreds of receiver locations. Because each source-receiver pair may make a valuable contribution to the desired output image, the data handling load (i.e., the input/output data transfer demand) can be a burden in itself, independent of the computation burden.

Seismic data analysts have historically used several different approaches to manage these burdens, directly or indirectly. These approaches relate principally to either the manner in which the data acquisition exercise is designed and carried out, or to the assumptions made during the data analysis effort. In both cases, the quality of the output of the data interpretation procedure may be directly affected. These approaches are most easily discussed in conjunction with FIG. 1, which depicts a perspective view of a region 20 of the earth for which a geophysical image is desired. On the surface 18 of the earth are shown a number of shot lines 2 along which the seismic data are acquired. As shown in FIG. 1A, shot lines 2 consist of a sequence of positions at which a seismic source 3 is placed and from which seismic signals 5 are transmitted into the earth. Receivers 4 placed along each line receive the signals from each source position after reflection from various subsurface reflectors 6.

A first method of managing the seismic data burdens discussed above involves careful definition of the region over which the data are acquired. Specifically, use of any available preliminary geologic and geophysical information may facilitate the minimization of the surface area over which seismic data may need to be acquired. Such a minimization will directly reduce the amount of data that is ultimately acquired. Furthermore, similarly careful planning of the spacing between shot lines will optimize the analysis effort by reducing data volume. And finally, optimization of the number of sources and receivers that are used, and of the spacing between adjacent source and receiver positions, will also benefit the data analyst.

None of these efforts can be accomplished without a penalty. For example, relatively wide spacing between shot lines, or between sources and receivers, reduce the resolution of the computed seismic image, thus making interpretation more difficult. In addition, complex geologic features may not be resolvable without relatively close spacing. And finally, certain data acquisition exercises, such as in relatively unexplored areas, do not allow optimization of the surface area over which data is to be acquired. As a result, the data handling burden cannot be entirely eliminated through data acquisition planning.

Methods of minimizing the computational burden are often implemented during data analysis. One commonly invoked technique involves use of a two-dimensional geophysical model. For example, in FIG. 1A, the signals for each source are depicted as traveling in the plane directly beneath the shotline on which the source lies. Thus, the signal is assumed to propagate independent of out-of-plane geologic structures. This simplifying assumption allows use of two dimensional geophysical models in the image generation process, and, as is well known, two dimensional analysis procedures can be much more computationally efficient than three dimensional analysis procedures.

Limitations to the 2-D analysis assumption exist. Geologic structures are rarely, if ever, two dimensional; that assumption may therefore lead to inaccurately specified images. Because little is generally known of the geologic structure being investigated, the analyst usually does not know the extent to which that image is in error. In addition, because each plane is analyzed independently, the interpreter must tie the images for each plane to each of the others by interpolation or other similar interpretative methods if a continuous image across the entire cubic region is desired. Finally, some complex structures, such as faulted regions and salt features, cannot be accurately analyzed merely by use of two dimensional methods.

Because of these and other limits that have long constrained seismic data analysts, the petroleum industry has typically been an early user of newly developed high speed computer hardware. As each new generation of equipment has become available, analysis routines that implement fully three dimensional analysis capabilities have become more commonly used. Nevertheless, it is not uncommon for significant computer times to be involved in complex analyses, often involving weeks or months of actual processing time.

The recent availability of massively parallel processors offers a significant opportunity to seismic data analysts. Massively parallel processors (MPPs) have multiple central processing units (CPUs) which can perform simultaneous computations. By efficient use of these CPUs, the weeks or months previously required for complex analyses can be reduced to a few days, or perhaps a few hours. However, this significant advantage can only be realized if efficient computational algorithms are encoded in the MPP software. Thus, the opportunity MPPs offer seismic data analysts also creates a challenge for the development of suitable computational algorithms that take advantage of the multiple CPUs.

This challenge can be easily discussed by considering the manner in which computational algorithms have most commonly been written for existing seismic analysis routines. Until recently, computers relied on a mode of operation referred to as sequential computing. Sequential computing involves use of analytic routines that perform only a single procedure, or perhaps focus on a single subset of the data or image, at any given time. This is a direct result of a computer having only one CPU. For that reason, the only optimization procedures that can be employed on single CPU computers are those which increase the efficiency of the processing as to the procedure or subset. Because all calculations must ultimately be performed by that single CPU, however, the options for obtaining high performance are innately limited.

On the other hand, the multiple CPU capability of MPPs offers an obvious simultaneous computation advantage. This advantage is that the total time required to solve a computational problem can be reduced by subdividing the work to be done among the various CPUs, provided that the subdivision allows each CPU to perform useful work while the other CPUs are also performing work. Unfortunately, the disadvantage of multiple CPU hardware is that the sequential processing methods that have long been used in software development must be replaced by more appropriate parallelized computing methods. Simply stated, MPPs require that processing methods be developed which make efficient use of the multiple CPU hardware. Ideally, these methods should organize the distribution of work relatively evenly among the processors, and ensure that all processors are performing necessary computations all of the time, rather than awaiting intermediate results from other processors.

The challenge of defining parallelized processing methods, and of optimizing those parallelized methods once defined, is particularly acute in the seismic data processing arena. Seismic data consists generally of a large number of individual traces, each recorded somewhat independently of the other traces. Logically enough, sequential computing methods that require the analytic focus to be placed on a single calculation at a time adapt well to analysis of these independent traces. This is true even though computational bottlenecks may exist. For example, portions of the analytic sequence may require relatively more computation time than other portions, must be completed before other calculations may proceed, or may rely on similar input data as other traces, for example traveltimes. Since no simultaneous computations occur in sequential processing, none of these bottlenecks lead to a reduction in computational efficiency with a single CPU, except as to the total processing time that is required. Except as to that total time requirement, the existence of such computational bottlenecks does not otherwise pose problems for the analyst. To take fall advantage of MPP computing capabilities, however, where the goal is to perform simultaneous processing in all CPUs, methods for optimizing the seismic analysis phase by eliminating such bottlenecks must be developed.

This advantage of an MPP becomes clear by considering the limitation which calculation time places on image region size in single CPU computers. Increasing the size of the image, e.g., by expanding the size of cube 20 in FIG. 1, or increasing the amount of data to be processed, e.g., by adding additional sources 3 and receivers 4 to shotlines 2, increase the total computation. That direct impact on calculation time places a heavy burden on seismic analysts to optimize image size, especially since even small image regions may require weeks of computation time on even the highest speed sequential processing computers. In contrast, efficient processing on MPPs, which may have as many as or more than 256 individual CPUs, should only involve minimally lengthened computation times, since each CPU would assume just a fraction, for example $\frac{1}{256}$, of the additional work required by the larger region. This potential for scalability of the image region and the work load required in image generation is a principal benefit of MPPs, a benefit that can only be realized if parallelized seismic processing methods allowing such workload scalability are developed.

Basic considerations for determining efficient parallelized seismic processing methods become evident by reconsidering the above review of the seismic analysis process. As noted, the purpose of seismic analysis is to analyze measured seismic data using geophysical models to develop images of the subsurface. Therefore, each of three principal processing components—data, model, and image—may be considered to be a candidate for distributing computational work among the various processors in an MPP. One option for distributing work among the processors would be to assign different groups of the input seismic trace data to different processors. For example, traces may be grouped by source locations, with different processors being assigned different groups. Similarly, the output image could be subdivided and assigned to different processors. Finally, it may also be possible to subdivide the geophysical model used to generate the output image into groupings that can be assigned to the various processors. (That model is generally considered to be embodied in the arithmetic operations required by the mathematical model that is the subject of the processing effort. For example, in seismic analysis the mathematical model is often based on the wave equation). For example, the data may be transformed into the frequency domain, with individual frequencies assigned to individual processors. It may also be possible to develop combinations of these approaches. For example, groups of processors may be assigned collective responsibility for specific frequencies in the model and all depths in the image, while having individual responsibility for specific horizontal locations in the image. The challenge to the seismic data analyst is to determine methods of subdividing the seismic data, model, and image into components that can be assigned to individual processors in the MPP, thus allowing calculations to be performed in each processor independently of other processors. This subdivision of seismic data analysis into individual components is commonly referred to as seismic decomposition.

One type of MPP has from thousands to tens of thousands of relatively unsophisticated processing elements. In this kind of machine, the processing elements typically perform the same operation on multiple data streams, a Single Instruction, Multiple Data stream (SIMD) machine. An example is the CM2, a product of the Thinking Machines Corporation. These kinds of machines typically lack shared memory, i.e., each processor has its own separate memory unit and the information in the memory cannot be directly accessed by other processors. The individual processors typically have limited computing capability and memory. Because of the large number of processing elements and a lack of shared memory, data transfer between the processing elements is a major bottleneck in efficient utilization of the capability of the machines. Even with sophisticated interconnection techniques, such as in a hypercube arrangement, transfer of data between processors is a major factor in the running time of programs.

Other computers have much more powerful elements in arrays of tens or hundreds. The T3D, a product of Cray Research Corporation, is an example of this kind of machine. Besides having individual processing elements that are much more powerful than those in the CM2, the T3D has fewer of the elements and a physically distributed, logically shared memory. This Multiple Instruction Multiple Data stream (MIMD) machine has different elements performing different operations on different parts of the data at the same time. The reduced number of processing elements means that data does not have to be transferred to as many elements as in a SIMD machine. Because of the increased sophistication and cost of the individual elements and because of their fewer numbers, efficient utilization requires that the load on the processing elements be balanced. An additional factor is that each processing element must accommodate a larger subset of the overall data volume; computations that involve sorting of the data could become more complicated.

U.S. Pat. No. 5,404,296 issued to Moorhead discloses and claims a method for migration on an MPP in which there are a large number of processing elements arranged in a preselected, regular pattern. The data are initially shot-sorted and partitioned into blocks of shots so that the product of the number of receiver positions in the data set and the number of shots in a block equals the total number of processing elements available. Because 3-D seismic data volumes typically contain hundreds of shot and receiver positions, the disclosure and claims are limited to SIMD machines.

One approach that reduces the amount of the 3-D processing is to image a partially processed data set. This is particularly useful when the partial processing operation is computationally simpler than a complete imaging process. For example, prior to migration, the data could be stacked using a conventional Normal Moveout (NMO) velocity analysis. As will be familiar to those knowledgeable in the art, algorithms that perform migration of zero-offset data are computationally less intensive than those that migrate unstacked data. The stacking operation generally improves the signal to noise ratio of the data compared to that of the individual traces. To the extent that the stacked data accurately represents a hypothetical zero-offset trace, the computational burden is reduced.

In U.S. Pat. No. 5,349,527, Pieprzak and Highnam disclose a method for migration of such a data set on a SIMD MPP. The method starts with a 3-D data volume consisting of a time series (vertical axis) of reflection seismic data on a regular rectangular grid (horizontal axes) on the surface of the earth [(t, x, y) data domain]. A Fourier transformation is performed on the reflection seismic data to give a 3-D volume consisting of amplitudes as a function of frequency (vertical axis) on the rectangular surface grid [($\omega$, x, y) data domain, where $\omega$ is the temporal frequency]. The data are partitioned into frequency sub-bands, and within each frequency sub-band, at selected frequencies, data are partitioned into subsets of the rectangular surface grid and assigned to individual processors. This is necessitated by the limited memory capability of the individual processors. The limitations of the individual processors also necessitate a hypercube arrangement of the processors in order to reduce the time involved in data transfer between the processors.

In Pieprzak and Highnam's invention, the subsequent migration is accomplished by an iterative, two-step process. The first step is the downward continuation of a single frequency component over one depth interval. The contributions of all the frequencies are then summed to produce a migrated image at the bottom of the depth interval. The two steps are repeated for successive depth intervals until the maximum depth is reached.

The downward continuation is performed using the McClellan transform method given in Hale, D., 3-D Depth Migration via McClellan Transformations, 56 Geophysics 1778 (1991). The actual implementation is done by means of a convolution filter. As will be known to those familiar with the art, the Hale method has difficulty handling steep dips and the computational burden becomes very heavy at dips greater than 60°. To reduce the computational burden, Pieprzak and Highnam teach the use of a recursive Chebyshev filter for the convolution step. The coefficients of the filter are precomputed from the velocity model of the subsurface and stored redundantly in the local memory of the processing elements. Such an approach is appropriate in SIMD computers where the processing elements need to keep track of only small subgrid of (x, y) points and do not have the capability of computing the filter coefficients "on the fly."

Those knowledgeable in the art recognize that for large problems, frequency domain methods can offer significant computation cost savings. Furthermore, the prior art two-pass migration methods are computationally fast because they perform the migration in the x- and y-direction separately. Pieprzak and Highnam use a one-pass frequency-space domain migration process that is computationally more accurate than the two-pass migration process used in prior art. However, the increased accuracy of the one-pass method comes at the cost of vastly increased computational load. One option for overcoming that increased computational load is to employ frequency-wavenumber migration, which can be significantly faster than frequency-space migration. However, a frequency-wavenumber scheme based on Pieprzak and Highnam's disclosure would be impractical for the reason that the transformation from the spatial domain to the wavenumber domain becomes expensive when each processor has access to only a small portion of the x-y grid.

U.S. Statutory Invention Registration H 482 issued to Berryhill, Gonzalez and Kim in 1988 discloses a method for recursive time migration in the frequency-wavenumber domain. That method assumes that the subsurface of the earth can be modeled by layers in which the velocity is constant. However, the method is inefficient to implement on an MPP because it requires successive Fourier transformations in different directions on a data volume entirely within processor memory, and the geophysical data sets of interest to industry cannot be stored entirely within processor memory.

It would therefore be desirable to have a method that is able to perform a one-pass migration in the frequency-wavenumber domain on an MPP in a cost-effective manner. The present invention satisfies this need.

SUMMARY OF THE INVENTION

The present invention is a method of processing seismic data on parallel processors, preferably on a massively parallel processor (MPP). The end product of the invention is a migrated seismic section in the form of an image of the subsurface of the earth. The input to the process may be of either stacked seismic data or of Dip Moveout (DMO) corrected common offset seismic data. The process migrates seismic data in the frequency-wavenumber domain, thereby significantly increasing the computational speed over frequency-space methods.

A velocity model is used by the individual processors of the MPP to obtain parameters for the migration operation. The individual processors perform migration calculations independently of the other processors. The invention partitions the data on the individual processors to make the subsequent processing efficient. The process uses a series of matrix transpositions to efficiently implement the Fourier transformations required for the migration in an efficient manner on an MPP.

In one embodiment, the data are migrated to produce an image, in depth, of a 3-D data volume. This embodiment uses a computational scheme in which the velocity of propagation of seismic waves in the subsurface can vary laterally and vertically. The data are downward continued in the frequency-space domain from one depth to the next using the velocity model; summation of the various frequency components produces a migrated depth image. The downward continuation is done in two steps: First, a paraxial approximation to the wave equation is solved using an implicit finite difference method with a splitting of the equation in the inline x and crossline y directions. This is analogous to prior art that used a two-pass migration process. The splitting reduces the computational burden by several orders of magnitude but introduces an error in the solution. Second, an error correction is performed that compensates for the error introduced by the process of splitting the wave equation into x and y components. The error correction is computationally fast because it is performed in the frequency-wavenumber domain, and does not have to be carried out at every depth interval. The result is an accurate solution of the wave equation valid for steep dips.

The solution of the wave equation for the downward continuation step requires the solution of a large tridiagonal system of equations. The present invention includes a novel "burn at both ends" method for solution of such a system of equations on an MPP. By efficient use of the processors, the method performs the downward continuation in approximately half the computation time that would be needed in prior art methods of solving such a system of equations.

In a second embodiment, the end product of the process is a migrated time image. The seismic data (stacked traces or DMO corrected traces) for a 3-D volume, after preprocessing, are downward continued on an MPP computer. The method starts at the surface and proceeds time-step by time-step using a phase shift method. Summation of the contributions of the individual frequencies produces a migrated image. The second embodiment is implemented in the frequency-wavenumber domain, thereby providing a significant increase in computational speed over prior art.

In a third embodiment, the end product of the process is also a migrated time section. The velocity model is a piecewise continuous function of depth. Starting at the surface with data in a (t, x, y) cube, the so-called Stolt migration is applied over each interval. This is done recursively, alternating the Stolt migration with a downward continuation of the wavefield in each layer. This embodiment is also implemented in the frequency-wavenumber domain. For subsurface models that have relatively thick layers of constant velocity, this embodiment offers a significant improvement over the second embodiment.

BRIEF DESCRIPTION OF THE DRAWINGS

The present invention and its advantages will be more easily understood by reference to the following detailed description and the attached drawings and tables in which:

FIG. 6A and 6B show the procedure for retrieving previously computed partial images and the method for combining partial images in a depth migration logarithmic fan-in.

DETAILED DESCRIPTION OF THE INVENTION

The present invention is a method of processing seismic data on a parallel processor. The method may be employed on any type of parallel processing computer that has more than one processor available to perform analysis and/or input/output tasks. For example, a Cray Y-MP, which has up to eight processors may be employed. Networked personal computers or workstations may also be employed. In a preferred embodiment, the method will be employed on a massively parallel processor (MPP) having 64 or more processing elements. One example of such an MPP is the T3D made by the Cray Research Corporation. For convenience, and not to be construed as limiting, the abbreviation MPP will be used herein to refer to any parallel processing computer suitable for the present method. However, use of MPP in that manner is in no way to be construed as limiting application of the present method to solely those computers deemed by the commercial marketplace to be massively parallel.

While the implementation is discussed in terms of a MIMD machine, the invention is not restricted to them. Apart from velocity data, the present method involves use of a relatively small number of input processing parameters, and therefore can also be usefully implemented on SIMD MPPs. In both MIMD and SIMD implementations, the input parameters are read into one processor and broadcast to the other processors.

Figure 1:
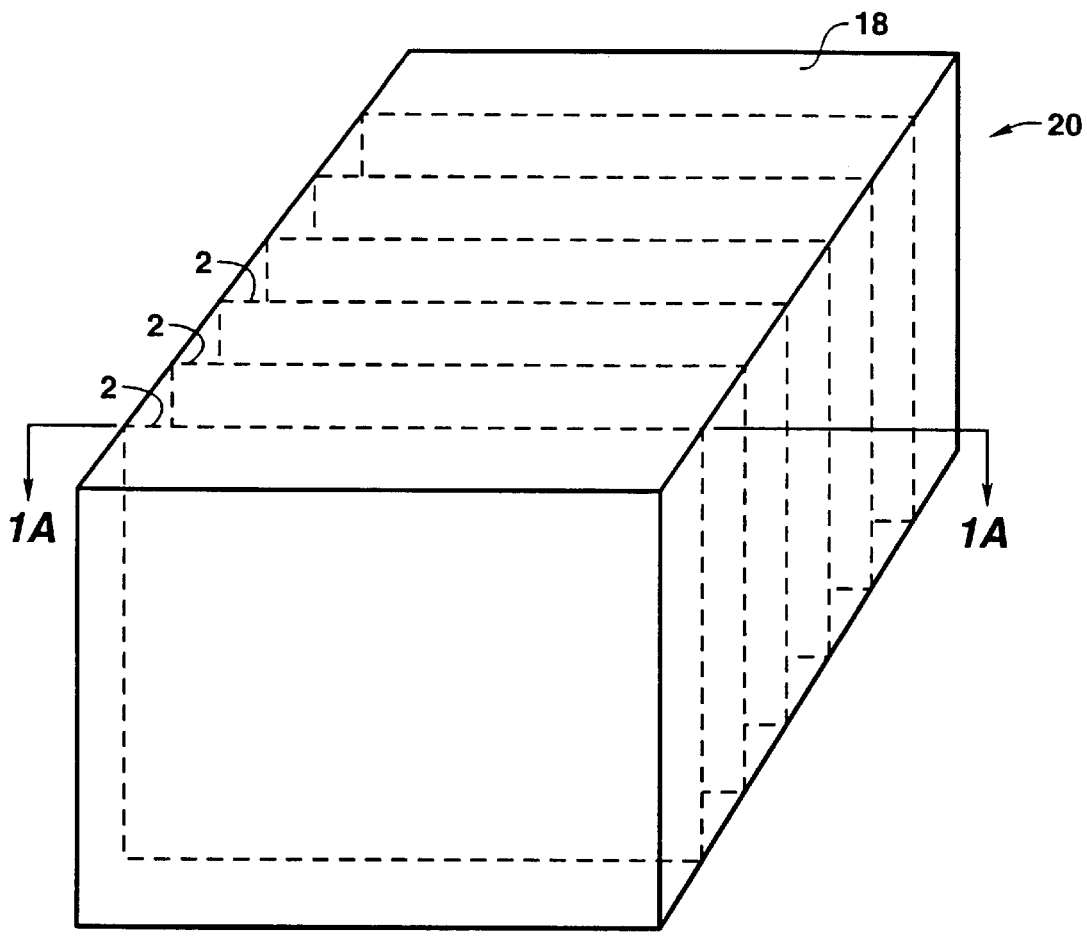
FIGS. 1 and 1A schematically illustrate the data acquisition configuration typically used in 2-D seismic exploration.
Figure 1A:
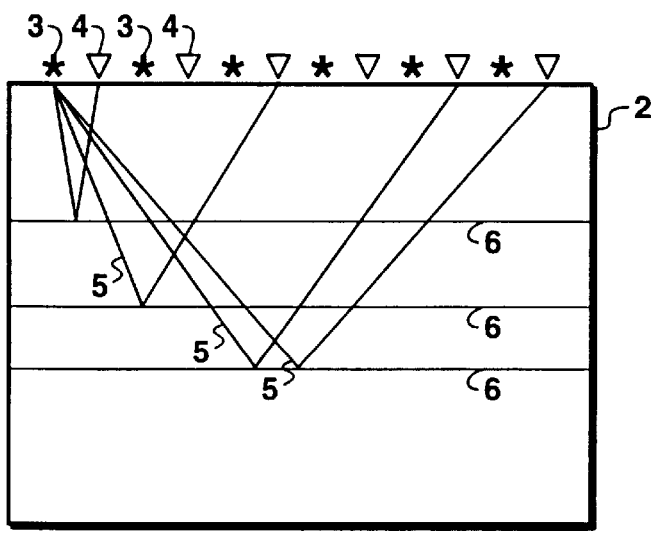

As is well known, seismic data processing methods generally start with data from a portion of the earth's surface. FIG. 1 depicts a perspective view of a region 20 of the earth for which a geophysical image is desired. On surface 18 of the earth are shown a number of shot lines 2 along which the seismic data are acquired. As shown in FIG. 1A, shot lines 2 consist of a sequence of positions at which a seismic source 3 is placed and from which seismic signals 5 are transmitted into the earth. Receivers 4 placed along each line receive the signals from each source position after reflection from various subsurface reflectors 6. As will be known to those familiar with the art, it is now common for the acquisition to be carried out with multiple rows of sources and receivers. The present disclosure is meant to encompass these situations as well and the preliminary processing steps involved in the "binning" of such a data set are part of the art.

These reflection signals will typically be preliminarily processed using one of two known techniques. First, the preliminary processing may focus on producing a stacked data volume. The process of stacking consists of taking data from single line 2. By a process of velocity analysis and normal moveout (NMO) correction, an approximate zero-offset seismic section is obtained. In this 2-D section, the horizontal (x) coordinate is the position along the line 2, the vertical coordinate is time, and the data represent reflection amplitudes. By similar processing of a number of parallel lines, a 3-D data volume is obtained.

A second preliminary processing alternative may be used in which the data along the seismic lines may be dip moveout (DMO) corrected to produce a series of common offset panels with the same shot-receiver distance. The end result of both stacking and DMO correction, as is well known to those skilled in the art, is a 3-D data volume of reflection amplitudes in (x, y, t) space.

As would be familiar to those knowledgeable in the art, the processing direction need not be the same as the direction of data acquisition. Furthermore, it is possible to acquire seismic data from a single source with a multiplicity of lines of receivers. Such an acquisition geometry makes it possible to obtain a 3-D image of the earth and to perform the stacking and DMO correction in arbitrary directions. The present disclosure is intended to include such datasets.

For convenience, the detailed description of several embodiments of the present invention will be organized as follows: First, an introductory section discusses preprocessing considerations. Second, an overview of the major processing steps for the embodiment is presented. Second, a detailed description of the data manipulation procedures necessary for efficient implementation of the embodiment on an MPP is presented. Finally, the imaging scheme used in the embodiment is discussed. This organization is not be construed as limiting, however, but is merely used to simplify discussion of the various aspects of the present invention.

Depth Migration

Depth migration embodiments of the present invention allow for both efficient implementation of the depth migration imaging scheme in the frequency-space domain and for the optional implementation of an error compensation scheme to correct errors introduced by the migration. The error compensation is performed in the frequency-wavenumber domain, thereby allowing accurate migration results to be obtained in reduced MPP computation times. The embodiments include a novel solution scheme for the innermost portion of the migration calculation which reduces calculation times as compared to the prior art.

Preprocessing Considerations

As noted above, the preliminary processing of the seismic data depicted in FIG. 1 will generally involve either stacking or DMO analysis. The result of that preliminary processing is a 3-D data volume consisting of time series of reflection amplitudes recorded on a surface grid of inline x and crossline y directions, thereby defining the (t, x, y) data volume 30 depicted in FIG. 2. Data volume 30 consists of time series (vertical axis) recorded at various points on a horizontal surface grid, 32. Depth migration embodiments of the invention will generally continue with an additional data pre-processing step, performed on a computer such as the Cray Y-MP, to transform the data into a 3-D volume in (x, y, $\omega$). This step involves a Fourier transformation into a volume 34 in which the vertical axis is frequency and the horizontal axes are unchanged. This step will be understood to those skilled in the art.

Next, volume 34 is sliced perpendicular to the $\omega$ axis to give frequency slices, 36, to be used in the migration. The number of slices which are generated and the frequencies for each slice will be a function of the analysis to be performed, the nature of the dataset being analyzed, and other factors which are well known. The slices may optionally be compressed to minimize memory and data input/output communication burdens. The data compression might consist, without limitation, of any number of well known procedures, such as representing the data with fewer bits.

Depth migration preprocessing may also slice a precomputed depth model for the migration. The depth model will consist of velocities as a function of depth on the same (x, y) grid as the data volume, and the depths and number of velocity slices will be also determined by the analyst. The velocity slices, 38 in FIG. 2, may also be compressed. The frequency slices and velocity slices are written to disk or other high speed device for subsequent use by the MPP. Hereinafter, the term "disk" is intended to include other high speed devices on which data can be written and from which it can be retrieved. Each of the above steps would be familiar to those knowledgeable in the art.

An initial allocation of the frequency slices to the processors in the MPP is performed based upon the number of x and y points in the data, the number of frequencies to be used in the migration and the memory available on each processor in the MPP. For convenience, this allocation is performed as part of the startup routine assigned to one PE within the MPP which acts as a control processor for the MPP in determining the allocation. The allocation will typically involve determining the minimum number of processors required per frequency slice, with each processor having an equal number of x and y data points at which calculations will be performed. However, the present method is not limited to use solely of that minimum number or to maintaining that equal number per processor, which are selected herein for convenience. Upon completion of this allocation, the control processor returns to functioning as an analysis processor, in the same manner as all other processors in the MPP. The purpose of the allocation is to determine the number of processors which will be required to perform computations for each frequency slice. The result of the allocation is that, in the computational procedures and data manipulations discussed further below, each processor is assigned one or more frequency slices, or in the alternative, a group of processors will be assigned a single frequency slice. If a single processor can be assigned more than one frequency slice, the frequencies are chosen so as to balance the computational load on the processors. Ordinarily, this will mean that a low frequency and a high frequency slice will be assigned in pairs to the processor. As would be familiar to those knowledgeable in the art, migration of low frequencies is less of a computational burden than migration of high frequencies; therefore such a pairing helps balance the computational load among the processors.

Processing Overview

Data Flow—Generally

Figure 3A:
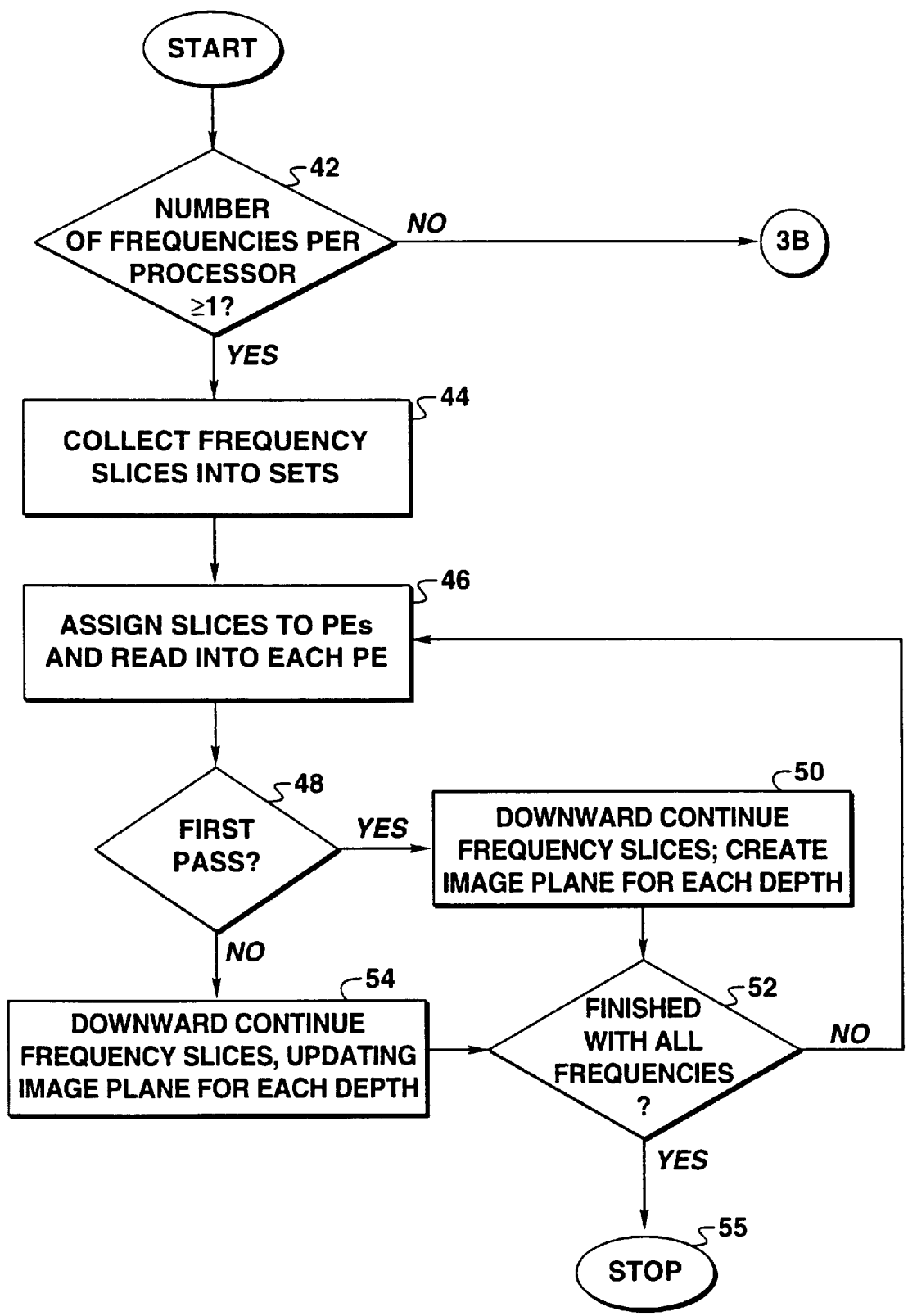
FIGS. 3A and 3B show the overall flow of data in the invention and conceptual steps involved in a first depth migration embodiment.

Referring to FIG. 3A, at "START" the data are read from disk to the PEs. If the number of frequency slices per processor, 42, is less than one, the processing follows the steps in FIG. 3B. If that number is one or more, then the frequency slices are collected into sets, 44, are assigned to processing elements (PEs), and read into the memory of each PE, 46. If the PEs are processing an initial set of frequencies in a first pass analysis, 48, the process of downward continuation and imaging (to be described below in conjunction with FIG. 4) is applied, 50. The result of this downward continuation and imaging is to create a partial image plane for each depth.

If additional frequencies remain to be processed, as is usually the case, additional frequency slices are assigned and read into each PE from disk, 46. For the processing of the second and subsequent set of frequencies, 48, the process of downward continuation and imaging, 54, updates the previously created image plane for each depth. This sequence repeats as long as additional frequencies are to be processed, 52. The migration is complete when all frequencies have been processed, 55.

Figure 3B:
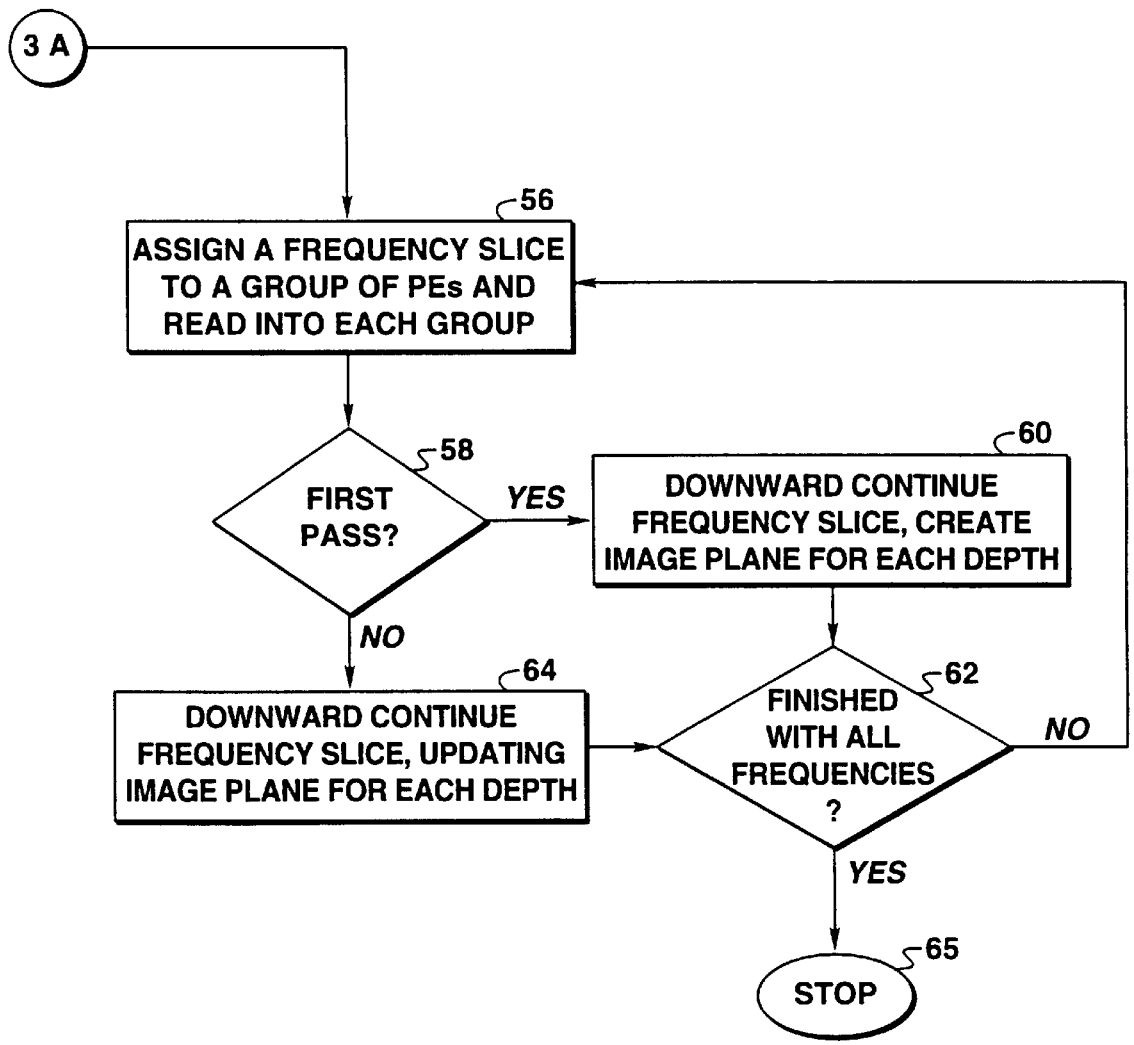

If more than one processor is required to hold the data for a single frequency slice, the steps in FIG. 3B are followed. FIG. 3B is analogous to FIG. 3A except that groups of processors are required to process each frequency. Each frequency slice is assigned to a group of PEs and read into each PE in the group, 56. For the first set of frequency slices, 58, the process of downward continuation and imaging (to be described later in conjunction with FIG. 4) is applied, 60. As above, the result of this downward continuation and imaging is to create an image plane for each depth. If additional frequencies are to be processed, as is usually the case, these additional frequencies are assigned and read into each group of PEs, 56. Also as above, for the processing of the second and subsequent set of frequency slices, 58, the process of downward continuation and imaging, 64, updates the previously created image plane for each depth. If all the frequencies have been processed, 62, the process is terminated, 65.

One of the noteworthy features of this invention is that depth migration embodiments have the ability to store intermediate results after a set of frequencies have been processed, 55 in FIG. 3A and 65 in FIG. 3B. The migration can therefore be continued or restarted at a later time, allowing correction or refinement of input parameters and analysis of intermediate results. The desirability of such a restart feature will be familiar to those knowledgeable in the art, although the cost effective implementation of such a feature has not previously been attained.

Data Flow—Downward Continuation and Imaging

Figure 4:
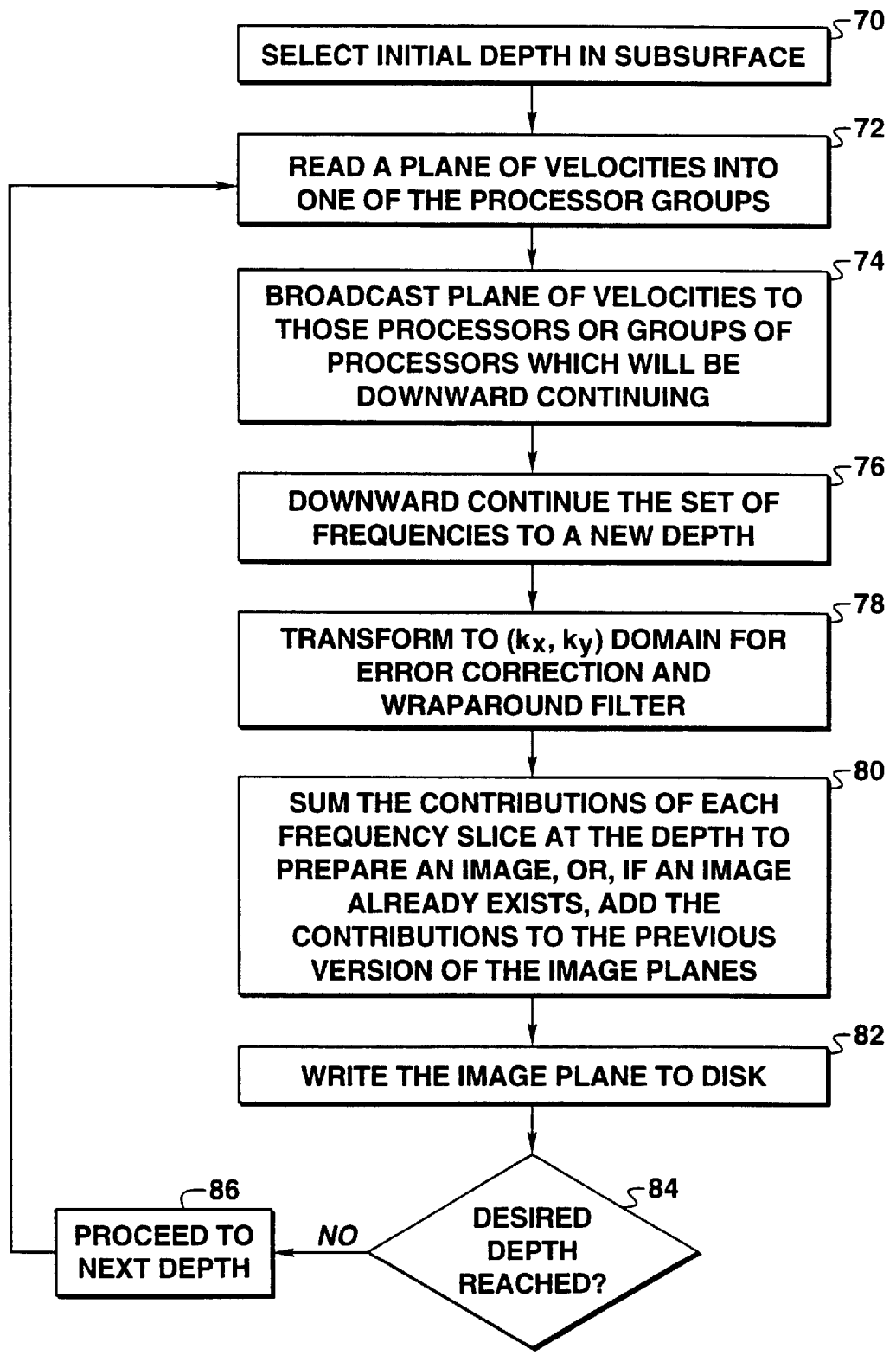
FIG. 4 illustrates the steps involved in the downward continuation and imaging calculations for the embodiment depicted in FIGS. 3A and 3B.

The downward continuation and imaging step, (50 and 54 in FIG. 3A, 60 and 64 in FIG. 3B), is described in more detail in FIG. 4. This process is performed by each processor or group of processors, i.e. 46 in FIG. 3A and 56 in FIG. 3B. The process starts, 70, at an initial depth in the subsurface, usually the surface of the earth. Next, the velocity data for the underlying depth interval is read from disk into one of the processor groups, 72. (It is to be understood from here on that when reference is made to processor groups, a group may consist of just one processor when one processor holds one or more frequencies.)

Figure 5A:
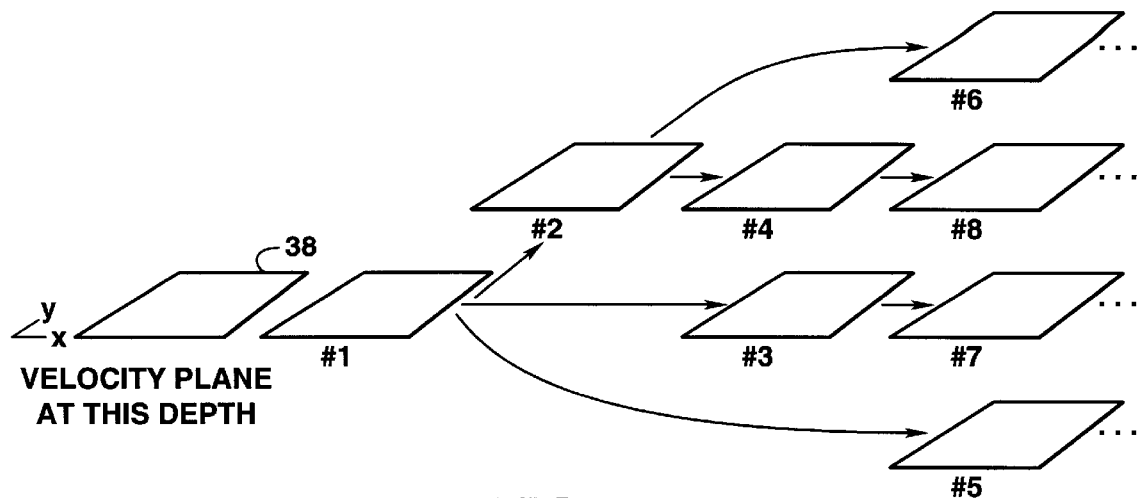
FIG. 5A, 5B and 5C pictorially depict the broadcasting of velocity slices between processor groups, the partitioning of a frequency slice among the PEs in a to different processor group and the downward continuation of a single frequency slice from the surface down one depth interval.

Because all processor groups in the MPP will be performing the downward continuation, efficient utilization of the MPP requires that this velocity information be efficiently made available to all the processor groups. In the preferred embodiment, the broadcast of velocities, 74, is performed by a process of logarithmic fanout. This step of logarithmic fanout is illustrated in FIG. 5A. Logarithmic fanout enables the velocity information needed for the downward continuation to be rapidly disseminated to all the processors. A compressed velocity slice, 38, from disk is loaded into a group of processors, labeled #1, and uncompressed. Subsequently, the uncompressed velocity data from #1 are transferred to a second processor group, #2. At the next stage, #1 sends the velocity slice to #3 while simultaneously, #2 sends it to #4. At the next stage, #1 sends velocity information to #5, #2 sends it to #6, #3 to #7 and #4 to #8. In this fashion, the number of processors that have the velocity information grows geometrically. This is known as a logarithmic fanout.

The labeling of the processor groups in FIG. 5A is for illustrative purposes only. In reality, the transfer of velocity data may be between processors in the same physical neighborhood within the MPP, or which may be otherwise closely connected by the MPP's internal communication pathways, or based on another communication relationship applicable to the MPP system being used. It is also to be understood that other schemes for dissemination of the velocity data could be used and the invention is not restricted to a logarithmic fanout. These would be familiar to those knowledgeable in the art.

In some MPPs, the processing elements have a buffered read and write capability. This embodiment of the present invention takes advantage of this capability by reading the velocity data from disk asynchronously. While the velocity data for one depth are being broadcast to all the processors, the velocity data for the next depth interval are being read from disk into the first processor. This procedure would be familiar to those knowledgeable in the art.

Figure 2:
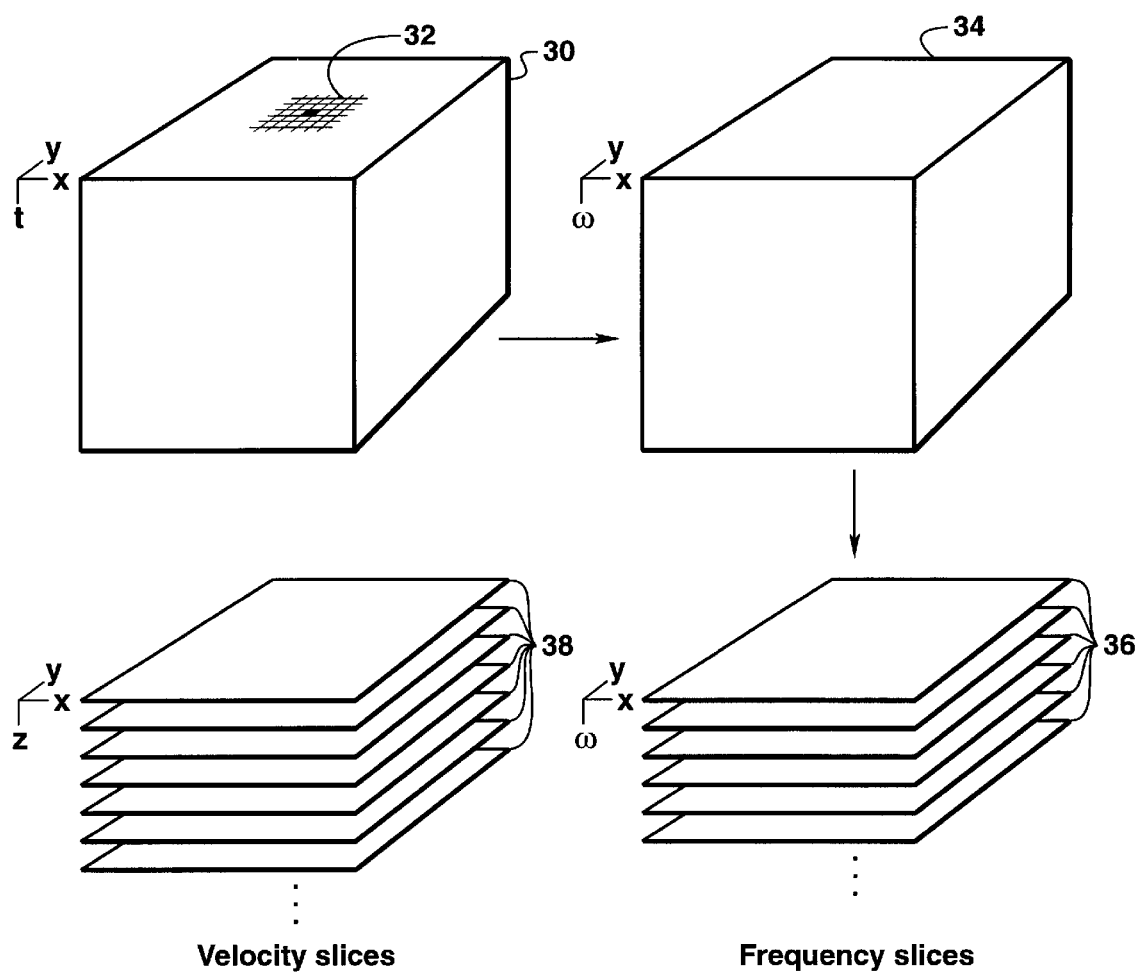
FIG. 2 shows the preprocessing of the data required for a depth migration embodiment.
Figure 5B:
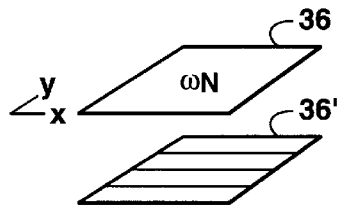

At the completion of step 74 of FIG. 4, each PE will have frequency slice data in its memory, via the assignment and reading procedures of step 46 in FIG. 3A and step 56 in FIG. 3B. Each PE will also have the velocity data from step 74 of FIG. 4. If the number of frequencies per PE is greater than or equal to one, then each PE will have the frequency and velocity slice data for all x and y positions in the data volume in its memory. However, if more than one processor is needed for a frequency slice, each PE will be assigned, and will retain in its memory, frequency slice and velocity data for the full range of the data volume along the x axis, but for only a limited range of y values. For example, a single frequency slice, 36 from FIG. 2, is shown in FIG. 5B. The partitioning of slice 36 is shown in 36', where each partition extends the entire length of the x-axis, but less than the entire length of the y-axis.

Figure 5C:
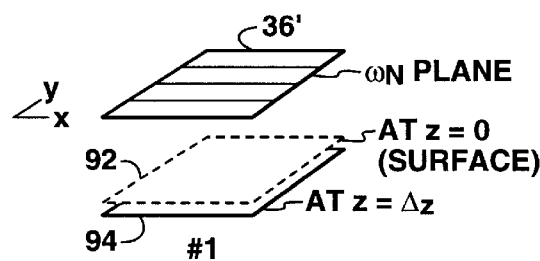

The downward continuation step, 76 in FIG. 4, consists of the PEs for each frequency slice 36 performing the downward continuation calculation for its frequency $\omega_n$. The downward continuation process, 76, takes these data at the initial depth, combines it with the velocity information in the underlying depth interval and produces frequency data for the bottom of the depth interval. FIG. 5C depicts the downward continuation from the surface down one depth interval. Frequency slice, 36', corresponding to frequency $\omega_n$, is downward continued from depth z=0 (92) to depth z=$\Delta$z (94). Each PE will perform the downward continuation for an entire frequency slice, or for the entire partition it has been assigned if more than one PE is required for each slice.

The downward continuation procedure in step 76 may involve any number of known procedures, as is discussed further below. In one embodiment, an approximation to the wave equation is used which reduces the computational complexity of the downward continuation process. The approximation relies on a paraxial form of the wave equation and a splitting in the inline x and crossline y directions. This is followed by an error correction scheme, 78 in FIG. 4. The error correction scheme compensates for errors introduced by the paraxial approximation, by grid dispersion and by the splitting of the wave equation into x and y directions. The error correction will not generally need to be done at every depth for which a downward continuation is performed, depending on the velocity model's characteristics. The downward continuation and error correction processes are discussed further below.

As will be understood by those skilled in the art, the summation, 80, of the contributions from the various frequency slices produces a depth image at the bottom of this depth interval. Where prior images exist from other frequencies, (as a result of prior analysis in 50 and 54 in FIG. 3A, or in 60 and 64 in FIG. 3B), these prior images are combined with the image produced at this step, 80. Steps 76, 78, and 80 are sometimes referred to by those skilled in the art as the migration process.

Figure 6A:
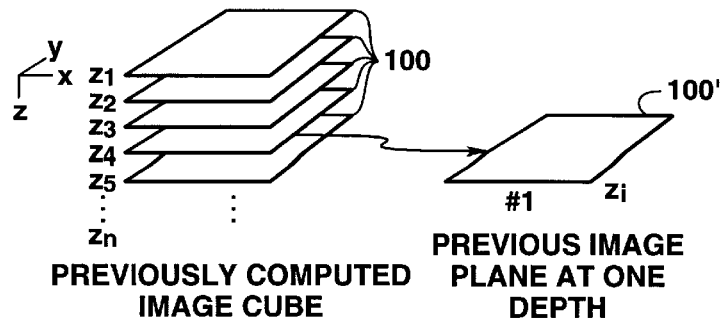
Figure 6B:
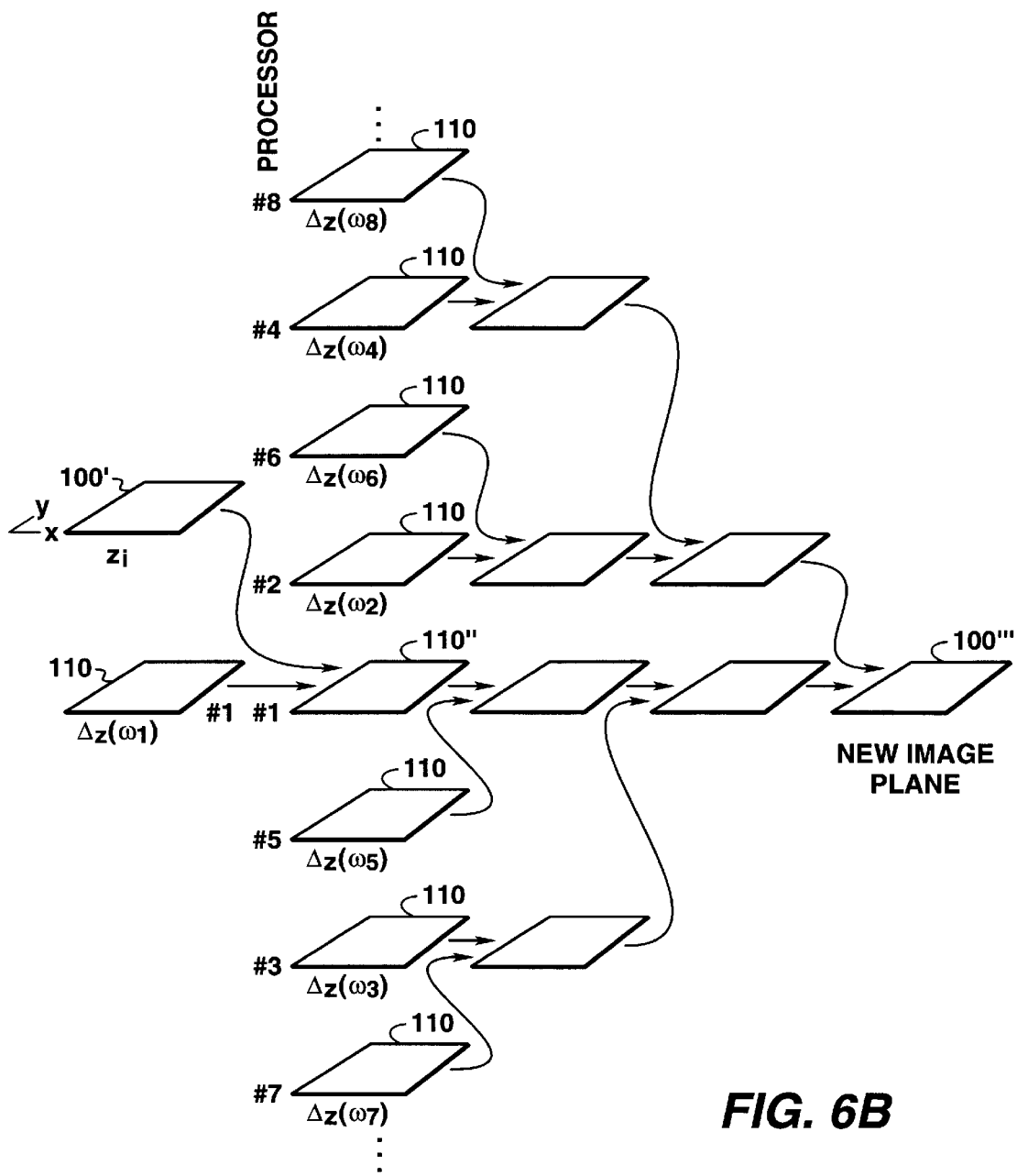

The process of summation of the frequency components and the prior images is illustrated in FIGS. 6A and 6B. FIG. 6A shows a series of partial images, 100, in the data volume that have been computed in earlier steps for depths $Z_1$–$Z_n$. The partial image corresponding to the depth at which the most recent calculations have been completed, shown as 100' in FIG. 6A, is retrieved from disk and transferred to a PE, labeled in FIG. 6A as #1. As noted above, PE #1 may also be a group of PEs. FIG. 6B shows PE #1 and other PEs, labeled #2 through #8, which have most recently performed downward continuation for a set of frequencies $\omega_1$ through $\omega_8$. The previously existing partial image at the depth of interest, 100', is added to the computed image 110 in PE #1 to produce an update partial image, 110". Similarly, the downward continuation images for frequencies $\omega_2$ through $\omega_8$ on processor groups #2 through #8 (all of which are shown as 110 in FIG. 6B for convenience) are combined with partial image 110" in a scheme that is the reverse of the FIG. 5A logarithmic fanout scheme used in broadcasting velocities, with the result that a new image estimate 100''' is obtained. Image estimate 100''' in FIG. 6B is an updated estimate of image 100' from FIG. 6A at the depth corresponding to the depth of image 100'. Where more than one frequency slice fits on a single processor, the images from these frequencies are combined within the processor prior to being combined with the images on other processors.

The updated image is written to disk or other hardware device, 82 in FIG. 4. It should be understood here that the number and labeling of the processors and frequencies are for illustrative purposes. The present method may be implemented with image updates occurring among any number of processors, and the reverse fanout scheme may be adapted accordingly. Other schemes may also be used to generate image updates. Finally, a check is made to see if the maximum desired depth has been imaged, 84. If not, the process is repeated for successive depth intervals, 86, 72.

As part of the load balancing on the processors, the same processor group does not perform the tasks of: (i) reading in and broadcasting a velocity slice as shown in FIG. 5A, (ii) reading in a previously computed image slice as shown in FIG. 6A, and, (iii) writing out an image slice to disk as shown in FIG. 6B. Instead, these tasks are performed by different processor groups, i.e., the processor groups labeled as #1 in FIGS. 5A, 6A and 6B may be physically different. One reason for these different assignments is to increase the efficiency in the use of processor memory. Specifically, in the present method, it is more efficient if each processor has only one portion of its memory allocated to be a data input/output buffer. Because that buffer can only be accessed for one task at a time, it is more efficient if each processor is assigned either an input or an output role at a time, and therefore the load balancing scheme of the present method involves ensuring that each processor is assigned only one I/O task at a time.

Data Manipulation

A well-understood challenge to the seismic data analyst is to develop data manipulation and storage schemes which efficiently and cost-effectively implement the processing procedures of interest on the computer system available to the analyst. The present invention includes a unique series of data manipulations which take advantage of the capabilities of the MPP, and which reduce the cost and time required for completing an analysis as compared to prior art techniques. These data manipulations are most easily discussed in conjunction with Table I, which shows the sequence of steps in which transform and transposition operations are performed by the present invention on the arrangement of the data volume in PE memory during the depth migration. Table I also shows the sequence in which the data are stored in processor memory at the end of each operation. These operations correspond generally to 76, 78, and 80 in FIG. 4, as discussed above.

The frequency slice data are stored in PE memory in (x, y, $\omega$) matrix format, which in Table I for convenience are referred to generally as the 1, 2, and 3 axes. Because each frequency slice will involve a fixed frequency on, this embodiment of the present invention involves a sequence of transform and transposition operations relating solely to the 1 and 2 axes.

The initial sorting of data, shown in step 1 of Table I, results from the Fourier transform of the data volume and the specification of frequency slices discussed above in conjunction with FIG. 2. In step 2, the downward continuation procedure is carried out, also as discussed above. This procedure occurs for all x and y grid points stored in each PE. If the frequency slice is partitioned over more than one PE, the procedure is repeated for all x and y grid points in the partition in the PE. Step 2 in Table I corresponds to 76 in FIG. 4.

Figure 8:
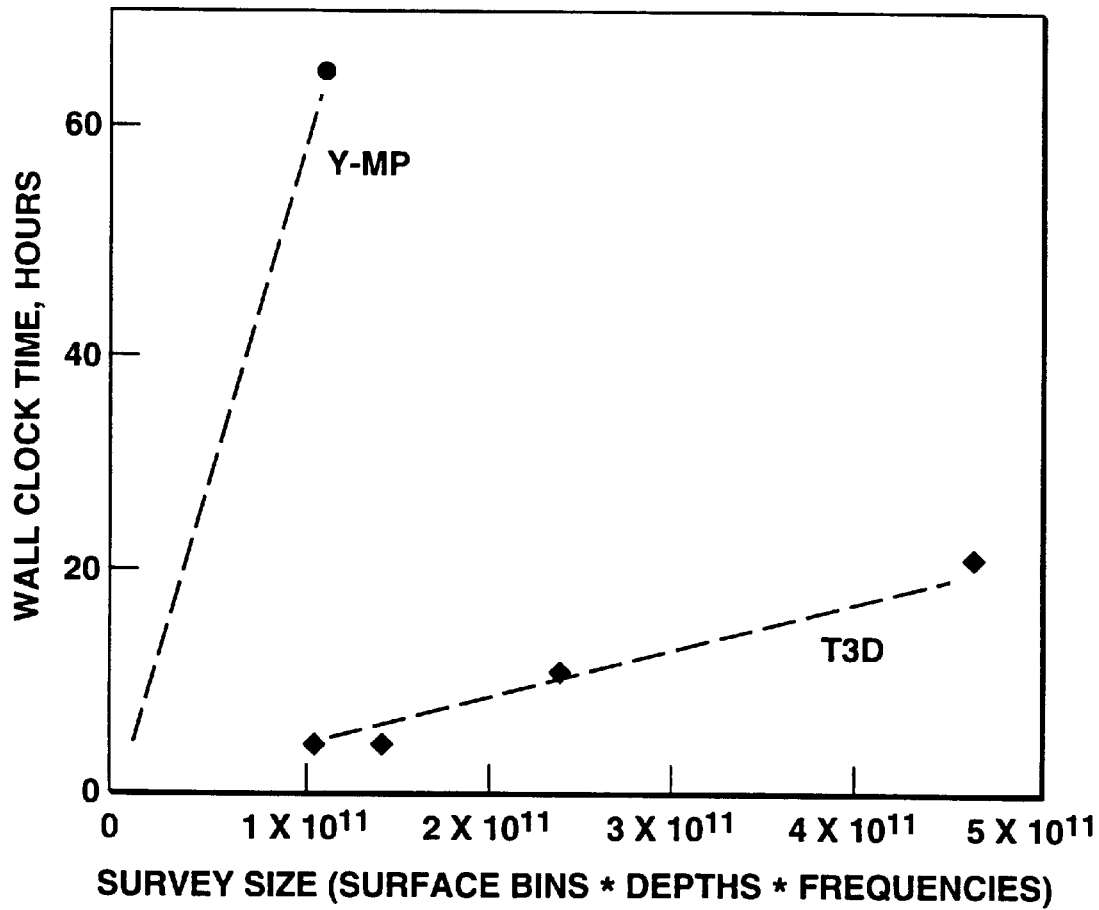
FIG. 8 depicts the calculation time improvements for a depth migration embodiment of this invention as compared to a prior art technique.

The next analysis procedures to be carried out, the error correction and wraparound filter procedures, correspond to 78 in FIG. 8. These procedures, steps 3 through 9 of Table I are optional to the extent that they are not performed at every depth, as discussed below. These procedures are most efficiently carried out in the wavenumber domain, and therefore are preceded by a series of matrix transpositions and Fourier transformations, as shown in steps 3, 4, and 5 of Table I. The transpositions are required because more efficient use of each processor in the MPP results if all Fourier transformations are performed along solely the axis—1, 2, or 3 in Table 1—in which the PE has the entire range of data. In the present method, all such transformations occur along the 1-axis, as follows. As discussed above in conjunction with FIG. 5B, each processor in a group has the entire range of x data in a frequency slice, but only has a portion of the y data (i.e. all data along the 1-axis of Table I, but only a portion of the data along the 2-axis). Each processor can therefore perform the step 3 Fourier transform of the x-data independently of the other processors. The output of that step is ($k_x$,y, $\omega$) format data. Next, in step 4, a matrix transposition of the 1 and 2 axes, which relies on MPP library matrix transposition routines, is performed. This transposition occurs among all processors in the group with the result that each processor has an entire range of y data in its memory, but for only a portion of the $k_x$ axis, and thereby permits the application of the FFT to y data in each processor in step 5. The result from step 5 is that both the x data and the y data are in the wavenumber domain. Step 6 is the application of the error correction and an optional wraparound filter, which does not involve a transformation of the ($k_x$ $k_y$, $\omega$) data.

Use of the splitting introduces errors into the wavefield extrapolation, as is described in Brown, D. L., *Applications of operator separation in exploration seismology*, 48 *Geophysics* 288 (1983), and would be familiar to those knowledgeable in the art. As shown by Li, Zhiming, *Compensating finite difference errors in 3-D modeling and migration*, 56 *Geophysics* 1650 (1991), the wave equation splitting error correction can be handled to first order by an extra phase shift term in the wavefield extrapolation. This error correction step (FIG. 4, step 78) requires that the data be transformed from the (x, y, $\omega$) domain to the frequency-wavenumber domain, therefore requiring steps 3, 4, and 5 of Table I. This error correction step usually needs to be applied only once every few depth extrapolation steps, as will be understood to those skilled in the art. Where there are large vertical velocity gradients, the error correction may have to be applied more frequently. It is to be understood that higher order corrections, though not used in this embodiment, could be implemented where there are large velocity gradients in the horizontal direction.

After the error correction is applied, an optional wraparound filter may also be applied. This wraparound filter would be familiar to those versed in the art.

After the error correction and wraparound filter, inverse procedures are performed to re-obtain the (x, y, $\omega$) domain. The inverse FFT in step 7 puts the data in (y, $k_x$, $\omega$) space. The inverse FFT algorithm is also applied along the 1-axis.

Thereafter, the step 8 transposition facilitates the step 9 inverse FFT which brings the data into the (x, y, $\omega$) space. The summation over $\omega$ in step 10 produces the depth-migrated image in (x, y, z) space for a single frequency, as discussed above in conjunction with step 80 of FIG. 4.

An important advantage of the present invention is that the above data manipulation scheme allows each PE to compute a direct "on the fly" solution of the wave equation in the downward continuation step, as opposed to prior art methods in which the PEs computed an indirect, look-up table solution by reliance on a precomputed filter coefficient table. The prior art methods were forced to perform that indirect solution due to the high computational burden which was previously required to directly solve the wave equation. The present scheme both eliminates that high burden and avoids those precomputed tables, thus providing more accurate processing results than have previously been attained in seismic data processing methods. That accuracy is independent of the degree of dip, thereby avoiding a principal concern of the prior art methods. In addition, by avoiding the pre-computation and storing of coefficient tables, the present scheme also allows a higher percentage of processor memory to be dedicated to computational tasks, i.e. by allowing larger and/or more partitions to be stored in each processor, thereby facilitating increased computational throughput compared to the prior art methods

TABLE I

Parallelization of Depth Migration Data Manipulation Tasks
Processors are in the 1–2 Plane.

| | | Axis | | |
|---|---|---|---|---|
| Step | Task | 1 | 2 | 3 |
| 1 | Start | x | y | $\omega$ |
| 2 | Downward Continue in x & y | x | y | $\omega$ |
| 3 | FFT | $k_x$ | y | $\omega$ |
| 4 | Transpose | y | $k_x$ | $\omega$ |
| 5 | FFT | $k_y$ | $k_x$ | $\omega$ |
| 6 | Apply Error Correction and Wraparound Filter | $k_y$ | $k_x$ | $\omega$ |
| 7 | Inverse FFT | y | $k_x$ | $\omega$ |
| 8 | Transpose | $k_x$ | y | $\omega$ |
| 9 | Inverse FFT | x | y | $\omega$ |
| 10 | Sum over $\omega$ | x | y | z |

Image Calculations

The data are downward continued (FIG. 4, step 76) by using an implicit finite difference scheme to solve the paraxial wave equation, for example as discussed in, Claerbout, J. F., *Imaging the earth's interior*, Scientific Publications, Inc. (1985). As would be known to those familiar with the art, a direct implicit solution of the finite difference wave equation requires the solution of a set of ($n_x \cdot n_x \times n_x \cdot n_y$) equations, where $n_x$ and $n_y$ are the number of points in the x and y directions of the data volume. In contrast, an explicit finite difference scheme requires fewer computations but is numerically unstable. The present invention obtains an approximate solution to the wave equation using an implicit scheme and by splitting the wave equation in the x and y directions. This scheme requires the successive solution of a much smaller set of matrix equations of order $n^x \times n_x$ and $n_y \times n_y$. The difference between implicit and explicit finite difference solution schemes will be understood to those skilled in the art.

Both sets of matrix equations involved in the downward continuation process require the solution of equations of the form $$A_x = b \qquad (1),$$

where the matrix A is tridiagonal. The vector x here refers to generic unknowns in the equation, not solely to the spatial coordinate x in the data volume. As is well known, the conventional solution of this equation proceeds by starting with the first equation and successively performing a series of eliminations to get to the last equation, and then back-substituting the solution obtained at that point in a reverse sequence to solve all the equations. This conventional solution works satisfactorily on an MPP where all the data for a single frequency slice are on a single processor because each of the processors can work independently of the other processors. This is also the case for the solution of the x-equations because, as described above, all the data are available in order within the memory of each processor. However, where more than one processor is needed for a single frequency slice, i.e. an individual processor is responsible for only a portion of the y-axis, as in 36' of FIG. 5B, direct application of the conventional method on an MPP is inefficient. Specifically, a computational bottleneck is created because only one PE can be solving the y-equations for each ω-slice, although each PE can solve all the x-equations. As a result, whenever a frequency slice is assigned to a group of more than one PE, the PEs in the group cannot be efficiently utilized.

The present invention is an improvement over prior art in that the y-equations may be solved so that two PEs are nearly always active on each ω-slice. Specifically, while the PE assigned to the smallest y-values begins eliminating the wavefield at those values, the PE assigned to the largest y-values also begins eliminating the wavefield, starting at the largest y-value and proceeding toward smaller y-values. As will be understood to those skilled in the art, this process involves the sequential elimination of unknown wavefield parameters. As each PE reaches the limit of its range of assigned y-values, it passes information describing the modified equations to the PE responsible for the adjacent range of y-values. This process continues until the wavefield can be completely determined at an interior value of y. As will also be understood to those skilled in the art, at this interior value the set of equations characterizing the wavefield will have been reduced from an indeterminate set to a determinate set, thus allowing the wavefield at this location to be determined. Thereafter, the wavefield at this value of y is used in a reverse elimination to determine the wavefield at both larger and smaller values of y, again permitting two PEs to be active at the same time. A special case arises when an odd number of PEs span the range of y-values. In this instance, the PE responsible for the central y-partition is active by itself for a portion of the calculation. This "burn at both ends" dual solution technique, as just described, avoids the transposition of the ω-slice which would otherwise be necessary to place the entire y-range within each PE as well as the corresponding inverse transpose. The "burn at both ends" technique could also be used in fine-grained MPPs in both the x and the y directions to reduce computation time. The computer code for this method is given in the Appendix.

In summary, the end product of the depth migration process is an accurate migrated image at considerably lower cost than can be obtained by a simple frequency-space migration. This is a result of using an approximate solution to the wave equation, utilizing the x-y splitting, using the "burn at both ends" method for solving a set of tridiagonal equations, and applying an error correction in the ($k_y$, $k_x$, ω) domain, each of which are efficiently implemented on an MPP.

Time Migration

Second and third embodiments of the present method perform time migration on an MPP. The second embodiment performs a time migration in the frequency-wavenumber domain, an improvement over prior art time-migrations which are limited to the frequency-space domain. A third embodiment offers a significant improvement in computational speed over the second embodiment when the velocity in the earth is constant over relatively thick intervals. The difference between these two embodiments lies in the imaging calculations which are performed.

Preprocessing Considerations

In a manner similar to the depth migration embodiment discussed above, an initial determination is made on the number of processors per group. There are differences, however, in the manner in which the data slices are determined, and in the data flow. Moreover, at different stages of the processing, the number of processors in a group may be different. These embodiments are discussed further below, using a three part breakdown analogous to that used above. In the following discussion, however, the data manipulation procedures which are involved in time migration will be discussed first, followed by the discussion of the data flow and imaging calculation procedures. This sequence simplifies the discussion of the more complex series of transpositions and transformations that are involved in the time migration embodiments, as compared to the depth migration embodiment discussed above.

Data Manipulation An important part of the time migration embodiments is the manipulation of the data and the manner in which it resides in the memory of the MPP. Both embodiments start with data in a (t, x, y) data volume, such as is depicted in FIG. 2. The MPP time migration sequence involves a series of transpositions and transformations analogous to those performed in the depth migration embodiment. However, the transposition and transformation sequence expands upon that which was required for the depth migration embodiment because Fourier transformations have to be made in both temporal and two spatial domains, as compared to the depth migration transformations which were only in the two spatial domains. As discussed above, the purpose of the transpositions is to ensure that all transformations are performed along the 1-axis, as that axis was defined above in conjunction with Table I and as used below in conjunction with Table II. The desire to perform all transformations along the same axis derives from the preference that only one PE be involved in the transformation, as was also noted above in the depth migration embodiment. Table II shows the effects of the transform and transposition operations on the arrangement of the data volume in memory during the various steps of time migration. Note that the sequence depicted in Table II also allows data to be optionally written to disk if it is desired to stop and later restart the analysis.

The data manipulation in the invention is designed to take advantage of the structure of the MPP. Initially, the data are in a (t, x, y) volume, Step 1. In contrast to the generally horizontal frequency slices depicted in FIG. 2 for depth migration, these slices are generally vertical, having a constant value along the y-axis. The data volume is sliced into y-planes, so that a group of processors has a t-x plane. The data are transposed in MPP memory, Step 2, and Fourier transformed to give a (k, t, y) volume, Step 3.

Next, a sequence of three transpositions, Steps 4, 5, and 6, allow a Fourier transform from the y spatial domain to the $k_y$ wavenumber domain, Step 7. One additional transposition, Step 8, facilitates a Fourier transform from temporal into frequency space ($\omega$, $k_y$, $k_x$), Step 9. The data are now in a position to be time-migrated, Step 10. As was noted above, the order in which the transpositions and the Fourier transforms are performed takes advantage of the structure of the MPP and the memory allocation in it.

After the Step 10 time migration process, the transpositions and transforms facilitate the return to the spatial domain [($\tau$, x, y) space]. These steps reverse the sequence of operations performed in Steps 2–8.

As indicated above in association with the depth migration embodiment of the present invention, the above time migration data manipulation scheme allows each PE to compute a direct solution of the wave equation in the migration step and to avoid the prior art's reliance on indirect, look-up table solutions in which, for example, separate operators were required for each frequency. The time migration embodiments of the present invention thereby attain more accurate, more cost-effective results than have previously been possible.

TABLE II

Parallelization of Time Migration Data Manipulation Tasks
Processors are in the 1–2 Plane.

| | | Axis | | |
|---|---|---|---|---|
| Step | Task | 1 | 2 | 3 |
| 1 | Start | t | x | y |
| 2 | Transpose | x | t | y |
| 3 | FFT | $k_x$ | t | y |
| 4 | Transpose* | t | $k_x$ | y |
| 5 | **Transpose | t | y | $k_x$ |
| 6 | Transpose | y | t | $k_x$ |
| 7 | FFT | $k_y$ | t | $k_x$ |
| 8 | Transpose | t | $k_y$ | $k_x$ |
| 9 | FFT | $\omega$ | $k_y$ | $k_x$ |
| 10 | Migrate | $\tau$ | $k_y$ | $k_x$ |
| 11 | Transpose | $k_y$ | $\tau$ | $k_x$ |
| 12 | Inverse FFT | y | $\tau$ | $k_x$ |
| 13 | Transpose* | $\tau$ | y | $k_x$ |
| 14 | **Transpose | $\tau$ | $k_x$ | y |
| 15 | Transpose | $k_x$ | $\omega$ | y |
| 16 | Inverse FFT | X | $\tau$ | y |
| 17 | Transpose | $\tau$ | x | y |

*Optional write to disk followed by
**Optional read from disk

Processing Overview

Data Flow—Generally

Figure 7A:
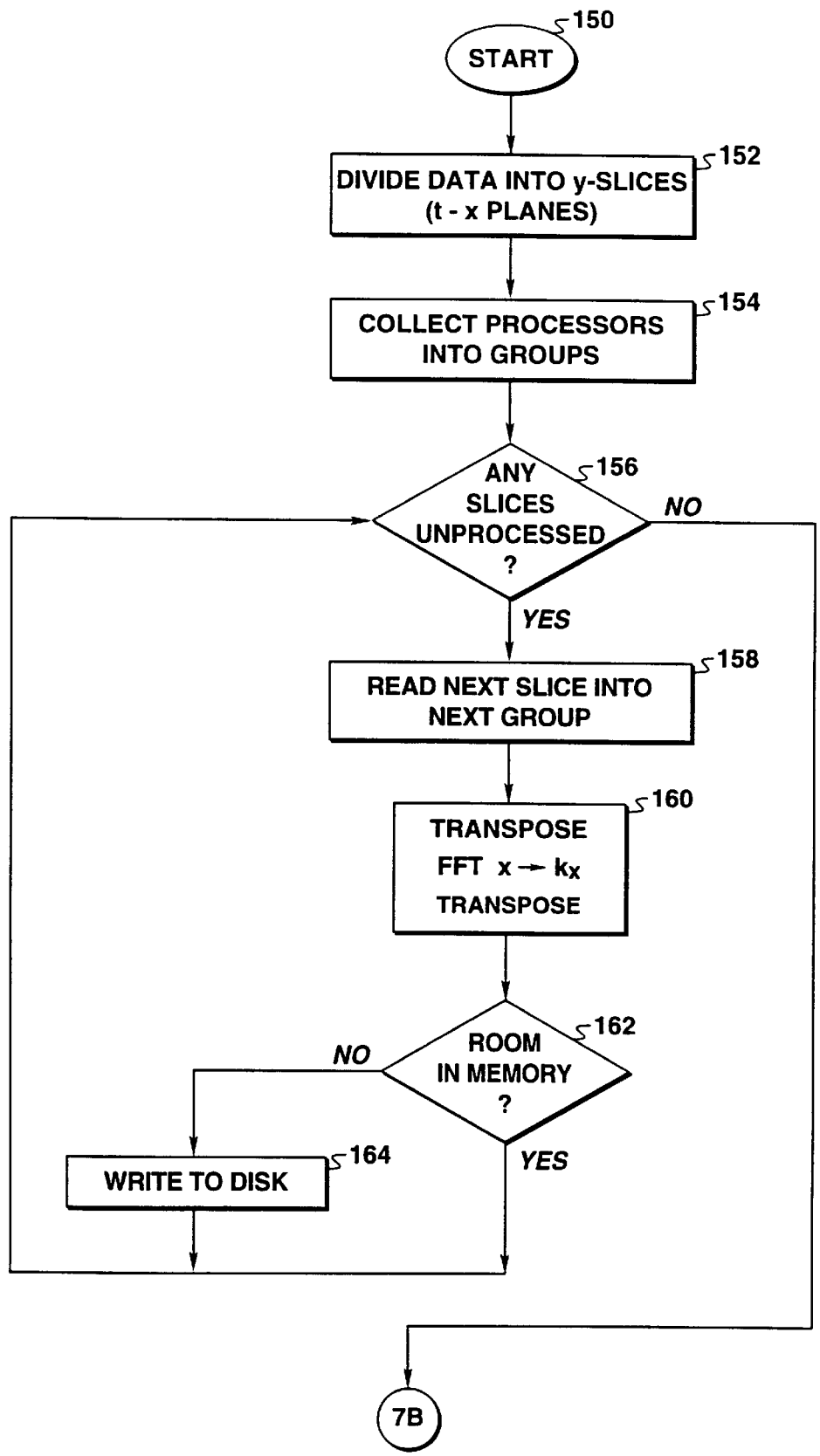
FIGS. 7A, 7B, 7C, 7D and 7E show the overall flow of data in time migration embodiments of the present invention.
Figure 7B:
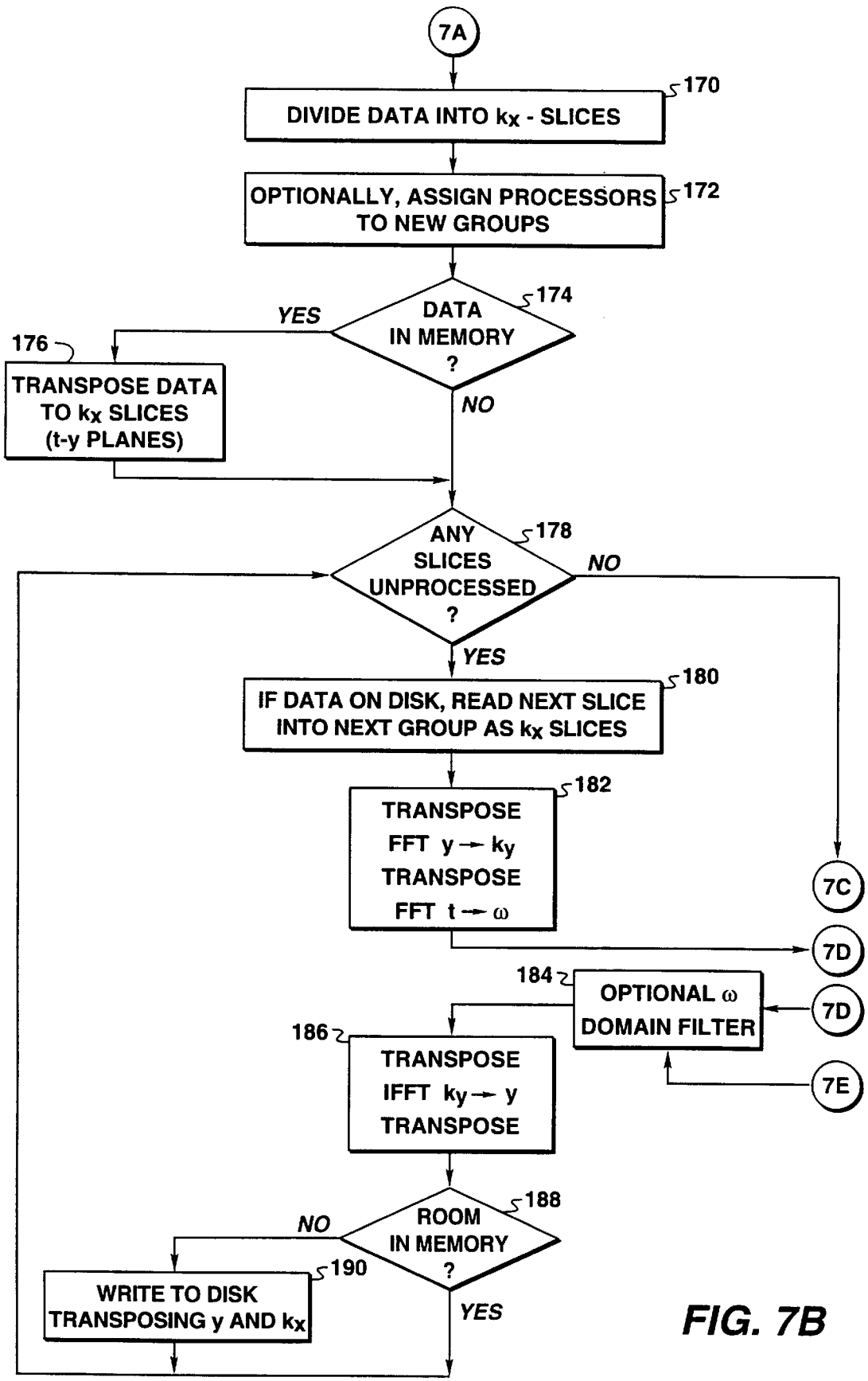
Figure 7C:
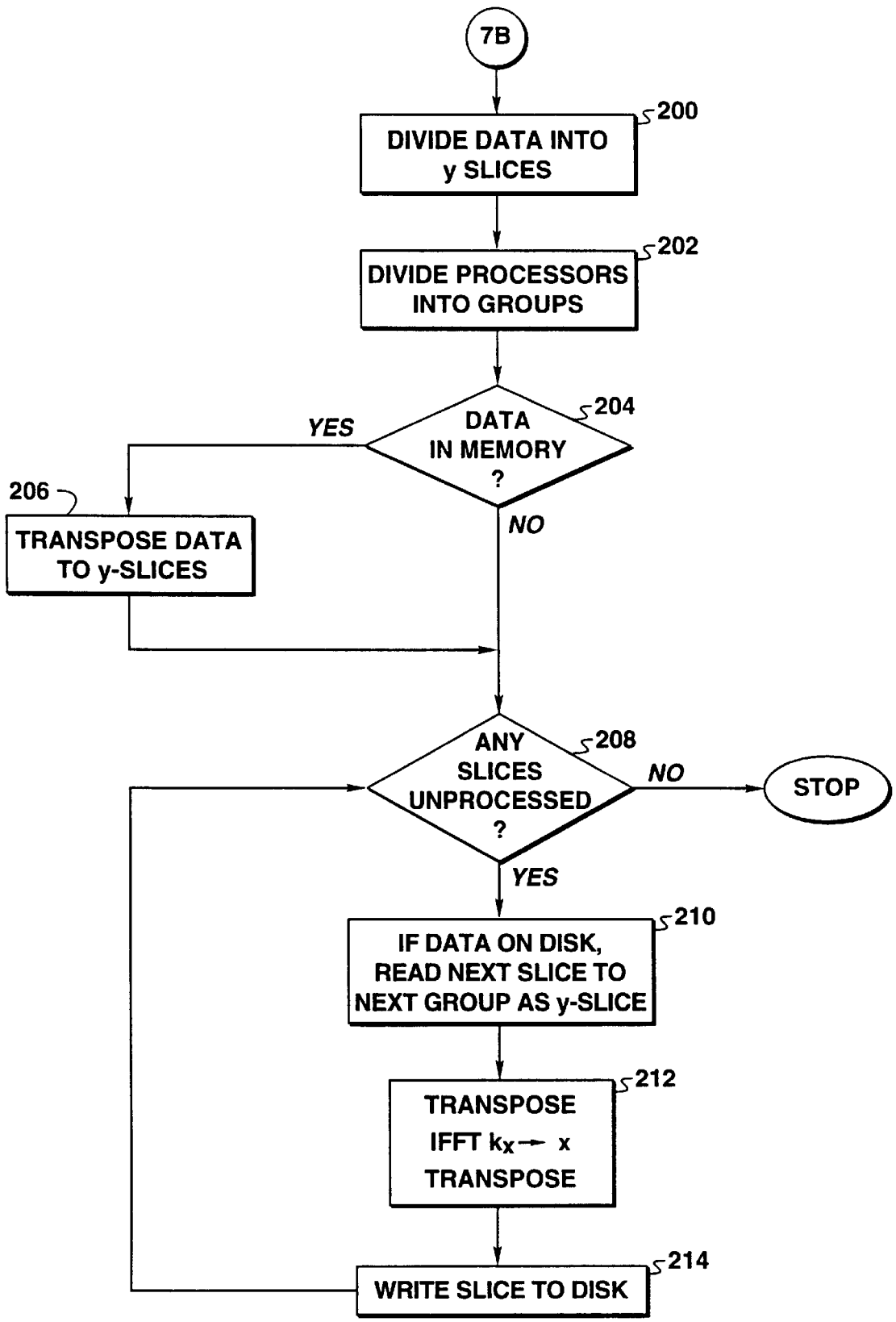
Figure 7D:
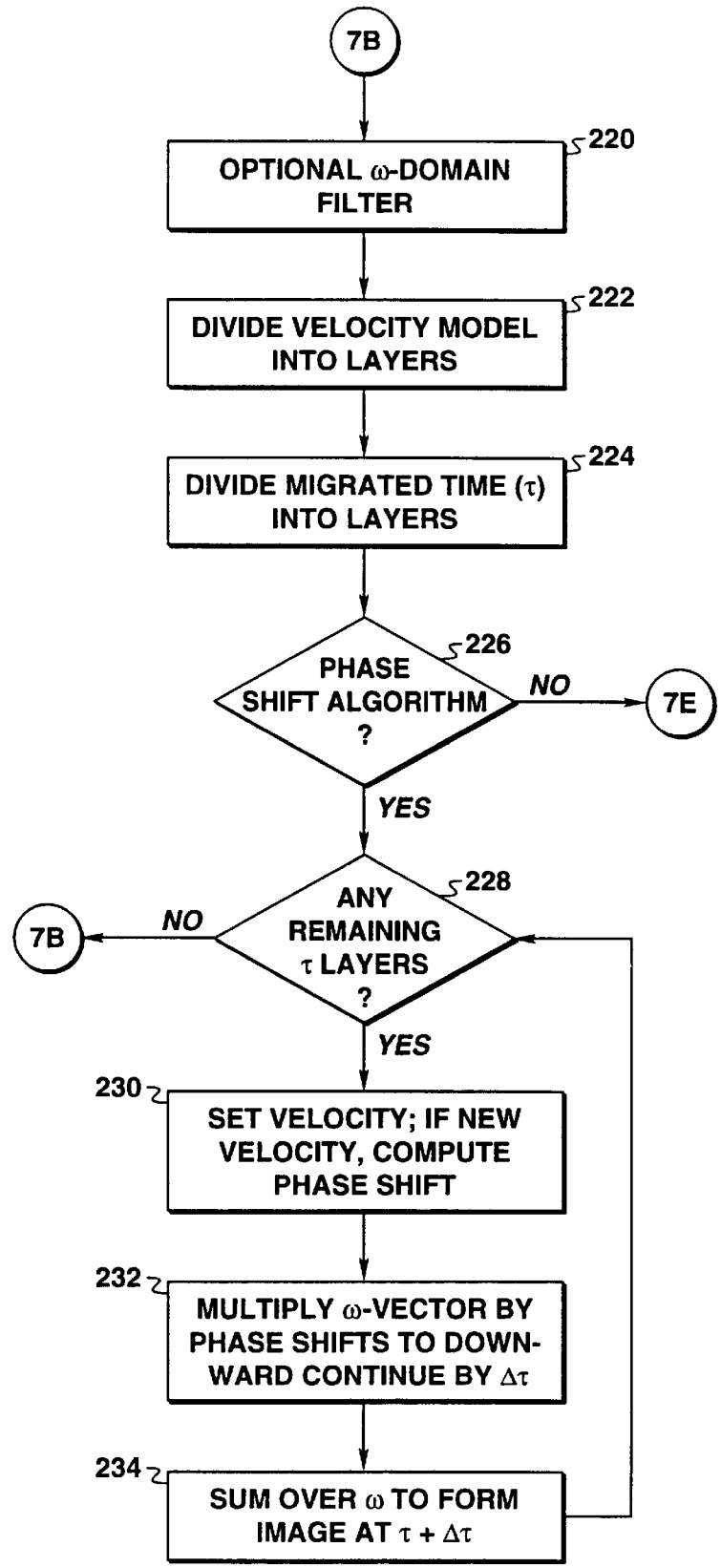

The overall flow of data is given in FIGS. 7A–7E. These Figures broadly focus on transformation of the x coordinate to the $k_x$ domain (FIG. 7A, steps 156–164), transformation of they coordinate to the $k_y$, domain (FIG. 7B, steps 172–182), and transformation of the t coordinate to the frequency domain prior to imaging, along with an optional final pre-imaging filter (FIG. 7B, step 182 and FIG. 7D, steps 220–224). The imaging sequences are outlined on the remainder of FIG. 7D and on FIG. 7E, and the post-imaging procedures required to transform the data back to the migrated time, generally referred to in the art as $\tau$, and x and y domains are shown on FIG. 7B (steps 184–190) and FIG. 7C.

The data are initially in a (t, x, y) cube, 150. The first step is to divide the data into y-slices, e.g., into planes in the t-x domain, 152. In contrast to the generally horizontal frequency slices depicted in FIG. 2 for depth migration, these slices are generally vertical, having a constant value along the y-axis. An initial allocation of these slices to processor groups is performed, 154. As above, it is to be understood that groups can consist of one or more processors. Next, the data are checked to see if any slices remain unprocessed, 156. Initially, of course, that would be the case and the next slice of t-x data is read into the next group of processors, 158.

An FFT is applied in the x direction to give y-slices of t-$k_x$ data, 160. As discussed above, this FFT is most efficiently implemented on an MPP if each processor performing the calculation contains all data along the x direction for a specific y-slice. Therefore, the FFT requires a transposition of the t-x data into x-t data, application of the FFT in the x-direction and a transposition back to give t-$k_x$ data. Depending on whether the PE can retain the data within its memory and continue processing, 162, processing either returns to 156, or writes the data out to disk, 164, prior to going back to 156.

After all the y-slices of data have been processed into the $k_x$ domain, transformation of the y coordinate to the $k_y$ domain is performed in an analogous manner (FIG. 7B, steps 172–182). However, this portion of the processing requires that the (t, $k_x$, y) data be subdivided into generally vertical $k_x$-slices, 172. As with the initial y-slicing, the number of $k_x$-slices, and the allocation of those slices to processor groups, 172, will depend on the size of the dataset (i.e. the number of samples in each of the three directions t, $k_x$ and y), the number of available processors, and the amount of memory available per processor, as will be understood to those skilled in the art.

If the data are in memory, 174, then they are transposed into $k_x$-slices, 176. Step 178 checks to see if all $k_x$-slices have been processed, and if so, the final processing sequence in FIG. 7C is initiated. If any of the $k_x$-slices is unprocessed, then the next group of $k_x$-slices are read into memory from disk if necessary, 180. During this read from disk, the transpose to $k_x$ slices which previously occurred in step 176 for data in memory occurs. At this stage of the process, the data are in (t, y, $k_x$) form. Step 182 involves the final transpositions and transforms to (t, $k_y$, $k_x$), and then by FFT to ($\omega$, $k_y$, $k_x$) space.

Figure 7E:
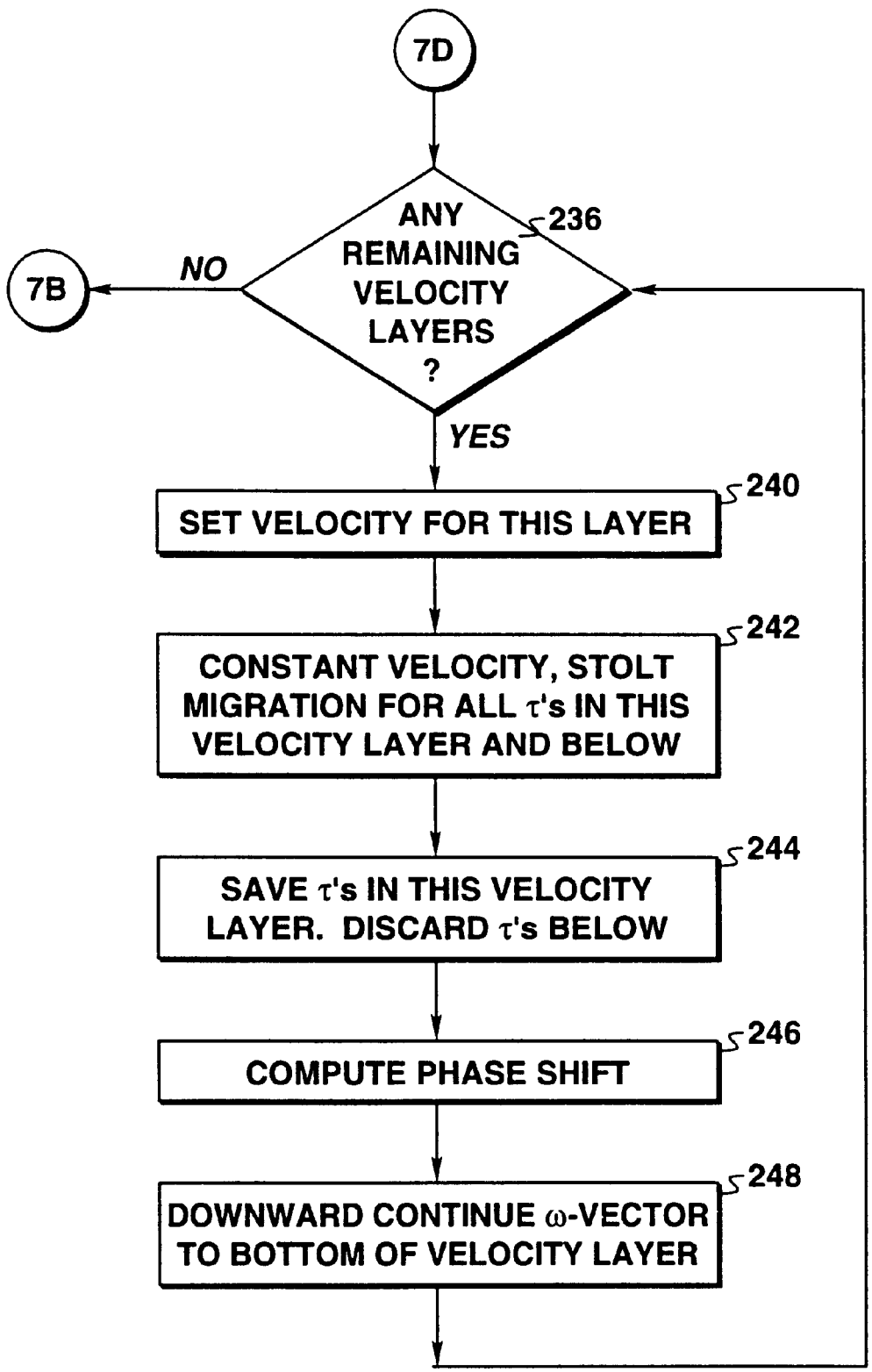

The data are then processed following the scheme in FIGS. 7D and 7E, to produce a migrated image in ($\tau$, $k_y$, $k_x$) space, where $\tau$ is the migrated time. This migration process is given below in the discussion of FIG. 7D and 7E. The procedure repeats via the additional slice processing sequence of steps 188 and 178, with, if necessary, data written to disk transposing y and $k_x$, 190. Note that steps 186 and 190 perform the transform and transpositions in steps 11, 12, 13, and 14 of Table II.

FIG. 7C outlines the steps involved in transformation from ($\omega$, y, $k_x$) space to ($\tau$, x, y) space, and is similar to and the reverse of the steps involved in the transpositions and transformations leading up to the migration step. Once again, the data volume is partitioned into y-slices, 200, and the data are divided among processor groups, 202. If the data are in memory, 204, they are transposed to give y-slices, 206. The slices are checked to see if any more y-slices remain, 208; if not the process is terminated. If, however, there are additional slices to be processed, they are read in to the processor groups from disk as y-slices if necessary, 210. The data are then transformed into the ($\tau$, x, y) space, 212. This requires a transposition, an inverse FFT, and another transposition to implement efficiently on an MPP. The migrated time slices are written out to disk, 214, as the end product of the migration process.

Data Flow—Migration

FIGS. 7D and 7E show the migration process. The ($\omega$, $k_y$, $k_x$) data volume from 182, FIG. 7B, is optionally filtered in the $\omega$-domain, and the velocity model divided into layers of constant velocity, 222. Note that these constant velocity layers are less complicated than the velocity model of the depth migration embodiment discussed above, and therefore the communication of the velocities to the processors will not generally require the broadcast technique employed in depth migration, although that technique may be employed. The desired migrated time domain $\tau$ is also divided into layers, 224. If the phase shift algorithm in the second embodiment is not to be used, 226, processing steps are shown in FIG. 7E. If the phase shift algorithm is to be used, the data are checked to see if there are any remaining $\tau$-layers to be processed, 228. If not, the frequency domain migration is complete and the data are sent back to 184 in FIG. 7B. If additional $\tau$-layers remain to be processed, the velocity for this layer is obtained; if it is different from the velocity for the previous $\tau$-layer, the frequency dependent phase shifts are computed, 230 and applied, 232, to downward continue from migrated time $\tau$ to time $\tau+\Delta\tau$. The data are summed over so to form an image at $\tau+\Delta\tau$, 234. This is repeated from 228 for additional $\Delta\tau$ intervals.

The third embodiment performs a recursive Stolt migration, shown in FIG. 7E. A full discussion of the conventional Stolt algorithm is given in Stolt, R. H., *Migration by Fourier Transforms*, 43 *Geophysics* 23 (1978). Other methods are known in prior art and the disclosure herein is not meant to be restricted to the recursive Stolt algorithm. The third embodiment here assumes that the velocity variation in the vertical direction may be approximated by layers within which the velocity is constant. The recursive Stolt method is also discussed in the Statutory Invention Registration H 482 of Berryhill, Gonzalez and Kim issued in 1988. However, the third embodiment is different from the invention disclosed by Berryhill et. al. in the method used for time migration. While the effect of FFT steps in the present invention is similar to that taught by Berryhill et. al., their invention does not have the matrix transpositions between successive Fourier transforms that is involved in the present method.

A check is made for any remaining velocity layers, 236. If no velocity layers remain to be processed, the frequency domain migration is complete and processing goes back to 184. If additional velocity layers remain to be processed, the velocity for this V-layer is obtained, 240. A Stolt migration is performed for all $\tau$s in this velocity layer and below, 242. There is no explicit downward continuation at this point. The $\tau$s in this velocity layer are saved, 244, discarding deeper migrated times. Next, the unmigrated data from the top of the layer are downward continued to the bottom of the layer using the layer velocity. This requires computation of a phase shift, 246, followed by a downward continuation, 248. This is repeated for additional $\tau$-layers, going back to 184 in FIG. 7B at the end of the completion of the frequency-wavenumber migration.

Imaging Calculations

The phase shift method of Gazdag, J., *Wave-Equation Migration with the Phase Shift Method*, 43 *Geophysics* 1342, (1978) is the basis for the time migration process in the second embodiment. The zero offset seismic section, p (x, t, $\tau$=0) for the 2-D case, may be considered as a wavefield measured at the surface of the earth. The variables x, t, and $\tau$ are the horizontal position, the two-way travel time, and the two-way migrated traveltime, respectively. The migration is performed by using the expression for downward continuation in the frequency domain $$P(k_x, \omega, \tau+\Delta\tau)=P(k_x, \omega, \tau) \exp(-i\, k_z v\, \Delta\tau/2) \tag{2},$$

where $$k_z=(4\,\omega^2/v^2-k_x^2)^{1/2} \tag{3},$$

with $k_x$ being the horizontal wavenumber and v the velocity in the interval $\Delta\tau$.

This invention uses equation (2) in a layer by layer extrapolation, replacing $k_x^2$ in equation (3) by $(k_x^2+k_y^2)$ for the 3-D equivalent of Gazdag's derivation. The time-migrated image is obtained as p(x, t=0, $\tau$), which is referred to by those skilled in the art as the imaging condition. In the frequency domain, this is obtained by summation of the various frequency components in the solution of equation (2), at 234 of FIG. 7D. As would be known to those familiar with the art, alternate solutions to the wave equation could be used, rather than equation (2). The present implementation of equation (2) is not meant to be a limitation on other means for wavefield extrapolation.

The third embodiment uses a recursive frequency-wavenumber migration process based on the so called Stolt migration. Stolt migration uses the result that the downward continued $P(k_x, \tau, \omega)$ in terms of the unmigrated wavefield $P(k_x, 0, \omega)$ and an extrapolation operator E($\tau$) is given by $$P(k_x, \tau, \omega)=E(\tau)P(k_x, 0, \omega) \tag{4}.$$

The extrapolation operator is given by $$E(\tau)=\exp[-i(\omega^2-W^2)^{1/2}\tau]h(\omega^2-W^2) \tag{5},$$

where h( . . . ) is the unit step function and $$W=k_x v/2 \tag{6},$$

v being the velocity in the layer.
The time migrated image is obtained as the inverse Fourier transform of $\Omega/(\Omega^2+W^2)^{1/2}P(k_x, \tau, \Omega)$ where $$\Omega=\omega(1-W^2/\omega^2)^{1/2} \tag{7}.$$

The recursive scheme first does the migration with a velocity appropriate for the first layer, discarding migrated times below this layer. This is followed by a downward continuation of the unmigrated wavefield to the bottom of the first layer. The downward continuation is done by the phase shift method given in the second embodiment. This produces data that would have been recorded at the bottom of the first layer. The Stolt migration is then performed with the velocity for the next layer and the process of downward continuation and migration repeated until the desired migrated time has been reached.

The recursive migration method is significantly faster than prior methods of migration because the migration is performed by making use of an FFT, as opposed to a convolution, and the migration and the downward continuation are performed over relatively large intervals in which the velocity is constant. The second embodiment requires a summation of the extrapolated wavefield over all frequencies to give a migrated image in the frequency domain. The third embodiment gives the time-migrated image for all $\tau$ within the velocity layer by an inverse Fourier transform. The phase shift used in the downward continuation is the same in the second and third embodiments. When the velocity layer thickness is equal to the τ-layer thickness, the two methods are theoretically equivalent, although computational efficiency will vary depending on implementation considerations, such as the FFT calculation routine being employed.

Depth Migration Example

The performance of the present invention, as compared to the prior art, is demonstrated in FIG. 8, which illustrates the reduction in clock time for a 3-D post stack depth migration using the present method implemented on a T3D MPP compared with that for a prior art method implemented on a Y-MP. FIG. 8 shows the clock time for a relatively small 3-D survey for which a post-stack depth migration was implemented on a 4 processor Cray Y-MP. Even for the relatively small data volume of $1 \times 10^{11}$, more than 60 hours were required to perform the migration. In comparison, a data volume almost five times as large can be processed on a 128 processor T3D in less than 20 hours. A data volume of $4 \times 10^{11}$, for example, corresponds to 100 frequencies for a survey size of 20 km.×20 km. with a sampling every 10 meters, and 1000 depths every 5 meters. The result is dramatically lower seismic data processing costs.

It should be understood that the invention is not to be unduly limited to the foregoing that has been set forth for illustrative purposes. Various modifications and alternatives will be apparent to those skilled in the art without departing from the true scope of the invention.

APPENDIX

```
C TITLE - Finite difference coefficient generator (TCDGEN_Y)
C FUNCTION - This subroutine generates the linear systems that result
from the
C   2D 65-degree finite difference approximation to each of the
    crosslines.
C   This routine handles both the case where a frequency plane spans
    several
C   PEs and the case where it is restricted to one PE.
C LANGUAGE - FORTRAN
C LINKAGE - FORTRAN CALL STATEMENT
C    CALL TCDGEN_Y (IER, NX, NY, OMEGA, VELOCITYD2,
     CP,
C      DZ, DY, OFFD, DIAG, RHS, INDEX, MYPE, NP, NLIST,
       MSGID)
C    PARM   DESCRIPTION      I/O C    IER    Error return       I I/O
C           = 0 No error
C           = 1 MYPE is not an element of NLIST
C           = 2 NY < 1
C           = 3 NP < 1
C           = 4 Error explained with a write statement
C    NX     Number of bins each line.       F I
C    NY     Number of gridlines on this PE  F I
C    OMEGA  Circular frequency for this slice.   E I
C    VELOCITYD2 is the velocity/2 field, size (NX,NY). E*4 I
C    CP     Complex freq. slice, size (NX,NY)    C*8 I
C    DZ     Vertical step size.             E I
C    DY     Spacing between crossline traces.    E I
C    OFFD   Complex array for off-diagonal of matrices C*8 O
C           of size NY
C    DIAG   Complex array for diagonal of matrices   C*8 O
C           of size NY.
C    RHS    Complex array for right hand side of     C*8 O
C           linear systems. Dimensioned (NY),
C    INDEX  The gridline to be processed     I I
C    MYPE   My processor id       I I
C    NP     The number of PEs in this group  I I
C    NLIST(NP)
C      A list of the PEs in this group       I I
C    MSGID The next valid message identifier  I I/O
C  EXT. REF.- PRTERR, PVMFPRECV, PVMFPSEND
    SUBROUTINE TCDGEN_Y (IER, NX, NY, OMEGA,
    VELOCITYD2, CP, DZ,
```

APPENDIX-continued

```
    &     DY, OFFD, DIAG, RHS, INDEX,
    &     MYPE, NP, NLIST, MSGID)
    IMPLICIT NONE
    INTEGER IER, NX, NY, INDEX, MYPE, NP, NLIST(NP), MSGID
    REAL   OMEGA, DZ, DY
    REAL*4 VELOCITYD2(NX,NY)
    COMPLEX*8 CPJ, CPJP1, TEMP1, TEMP2
    COMPLEX*8 CP(NX,NY), A1, A2, RHS(NY), OFFD(NY),
    DIAG(NY), C1
    COMPLEX CP0, CPNYP1, CPFIRST, CPLAST
    CHARACTER*500 ERR_MSG
    INTEGER I,J, MY_POS, INFO, IWHO, IWHAT, ITAG
    REAL*4 EPS, GAMMA, ALPHA, BETA, ONE, TWO, C2
    REAL   B1, B2
    INCLUDE 'fpvm3.h'
    IER = 0
    EPS = 1.0E-14
    GAMMA = 0.14
    ALPHA = 0.4782406
    BETA = 0.376369527
    ONE = 1.
    TWO = 2.
C Check for nonsensical NP.
    IF(NP.LT.1) THEN
      IER = 3
      CALL PRTERR (IER, MYPE,
    &     'Routine TCDGEN_Y has been accessed with NP less
    than 1.',
    &     'TCDGEN_Y')
      GO TO 990
    END IF
C Check for nonsensical NY.
    IF(NY.LT.1) THEN
      IER = 2
      CALL PRTERR (IER, MYPE,
    &     'Routine TCDGEN_Y has been accessed with NY less
    than 1.',
    &     'TCDGEN_Y')
      GO TO 990
    END IF
C Find out which PE I am on this list.
    IER = 1
    DO I = 1,NP
      IF(MYPE.EQ.NLIST(I)) THEN
        MY_POS = 1
        IER = 0
      END IF
    END DO
    IF(IER.NE.0) THEN
      CALL PRTERR (IER, MYPE,
    &     'MY processor is not in the group. This is in routine
    &     TCDGEN_Y.', 'TCDGEN_Y')
      GO TO 990
    END IF
C   Generate coefficient matrices and rhs for tridiagonal systems.
C   Along Y - direction.
C   OFFD is the upper and lower diagonal of the tridiagonal MATRIX
C   on the left hand side.
C   DIAG is the diagonal of the coefficient matrix.
C   DIAG is the main diagonaL.
    C1 = CMPLX (0.0, 1.0) * DZ * ALPHA / (2.0 * DY * DY *
    OMEGA)
    C2 = BETA / (DY * DY * OMEGA * OMEGA)
    DO J = 1, NY
      OFFD(J) = VELOCITYD2(INDEX,J) *
      (C2*VELOCITYD2(INDEX,J)
    &     -C1) + GAMMA
      DIAG(J) = ONE - TWO * OFFD(J)
    END DO
C   At the seams, exchange info for RHS and, possibly, for the
C   boundary conditions:
C   Shovel values to the left:
    IF(MY_POS.GT.1) THEN
      CPFIRST = CP(INDEX,1)
      CALL PVMFPSEND(NLIST(MY_POS-1),MSGID,CPFIRST,1,
      COMPLEX16,INFO)
    IF (INFO .LT. 0) THEN
      WRITE(ERR_MSG'("PVMFPSEND has returned an error",
    &     "code of",19,". In routine TCDGEN_Y.")') INFO
```

APPENDIX-continued

```
        CALL PRTERR (INFO, MYPE, ERR_MSG 'PVMFPSEND')
        IER = 4
        GOTO 990
      END IF
    END IF
C   Shovel values to the right:
    IF(MY_POS.LT.NP) THEN
      CPLAST = CP(INDEX,NY)
      CALL PVMFPSEND(NLIST(MY_POS+1),MSGID+1,CPLAST,
     1,COMPLEX16,
   &     INFO)
      IF (INFO .LT. 0) THEN
        WRITE(ERR_MSG,'("PVMFPSEND has returned an error",
   &    "code of",19,". In routine TCDGEN_Y.")')INFO
        CALL PRTERR (INFO, MYPE, ERR_MSG 'PVMFPSEND')
        IER = 4
        GOTO 990
      END IF
    END IF
C   Catch values from the neighbors, form the remainder of the RHS, and
C   set up the boundary conditions:
C   Catch values from the right:
    IF(MY_POS.LT.NP) THEN
      CALL PVMFPRECV(-1,MSGID,CPNYP1,1,COMPLEX16,
   &   IWHO,IWHAT,ITAG,INFO)
      IF (INFO .LT. 0) THEN
        WRITE(ERR_MSG,'("PVMFPRECV has returned an error",
   &  "code of",19,". In routine TCDGEN_Y.")') INFO
        CALL PRTERR (INFO, MYPE, ERR_MSG, 'PVMFPRECV')
        IER = 4
        GOTO 990
      END IF
C   Handle the left side of the seam and set up left boundary condition as
needed:
    IF(MY_POS.NE.1) THEN
      RHS(NY) = CONJG (OFFD(NY)) * (CPNYP1 + CP(INDEX,
        NY-1))
   &    + (1.0-2.0 * CONJG (OFFD(NY))) * CP(INDEX,NY)
    ELSE
      IF(NY.EQ.1) THEN
        A1 = 2.0 * CP(INDEX,1) * CONJG (CPNYP1)
        B1 = CP(INDEX,1) * CONJG (CP(INDEX,1))
   &       + CPNYP1 * CONJG (CPNYP1)
        IF(ABS (B1) .LE. EPS) THEN
          A1 = CMPLX (1.0, 0.0)
        ELSE
          A1 = A1/B1
        END IF
        IF (AIMAG (A1) .LT. 0.0)A1 = CONJG(A1)
        DIAG(I) = OFFD(1) * A1 + DIAG(1)
        RHS(1) = CONJG (OFFD(1)) * CPNYP1
   &       + ((1.0-2.0 * CONJG (OFFD(1)))
   &       + CONJG (OFFD(1)) * A1) * CP(INDEX,1)
      ELSE
        RHS(NY) = CONJG (OFFD(NY)) * (CPNYP1 + CP(INDEX,
          NY-1))
   &       + (1.0-2.0 * CONJG (OFFD(NY))) * CP(INDEX,NY)
        A1 = 2.0 * CP(INDEX,1) * CONJG (CP(INDEX,2))
        B1 = CP(INDEX,1) * CONJG (CP(INDEX,1))
   &       + CP(INDEX,2) * CONJG (CP(INDEX,2))
        IF(ABS (B1) .LE. EPS) THEN
          A1 = CMPLX(1.0, 0.0)
        ELSE
          A1 = A1 / B1
        END IF
        IF (AIMAG (A1) .LT. 0.0) A1 = CONJG (A1)
        DIAG(1) = OFFD(1) * A1 + DIAG(1)
        RHS(1) = CONJG (OFFD(1)) * CP(INDEX,2)
   &       + ((1.0-2.0 * CONJG (OFFD(1)))
   &       + CONJG (OFFD(1)) * A1) * CP(INDEX,1)
      END IF
    END IF
  END IF
C  Catch values from the left:
    IF(MY_POS.GT.1) THEN
      CALL PVMFPRECV(-1,MSGID+1,CP0,1,COMPLEX16,IWHO,
        IWHAT,ITAG,INFO)
      IF (INFO .LT. 0) THEN
        WRITE(ERR_MSG,'("PVMFPRECV has returned an error",
```

APPENDIX-continued

```
   &   "code of",19,".In routine TCDGEN_Y.")') INFO
        CALL PRTERR (INFO, MYPE, ERR_MSG, 'PVMFPRECV')
        IER = 4
        GOTO 990
      END IF
C   Handle the right side of the seam and set up right boundary condition
as needed:
    IF(MY_POS.NE.NP) THEN
      RHS(1) = CONJG (OFFD(1)) * (CP(INDEX,2) + CP0)
   &    + (1.0-2.0 * CONJG (OFFD(1))) * CP(INDEX,1)
    ELSE
      IF(NY.EQ.1) THEN
        A2 = 2.0 * CP(INDEX,NY) * CONJG (CP0)
        B2 = CP(INDEX,NY) * CONJG (CP(INDEX,NY))
   &       + CP0 * CONJG (CP0)
        IF(ABS (B2) .LE. EPS) THEN
          A2 = CMPLX (1.0, 0.0)
        ELSE
          A2 = A2/B2
        END IF
        IF(AIMAG (A2) .LT. 0.0) A2 = CONJG (A2)
        DIAG(NY) = OFFD(NY) * A2 + DIAG(NY)
        RHS(NY) = CONJG (OFFD(NY)) * CP0
   &       + ((1.0-2.0 * CONJG (OFFD(NY)))
   &       + CONJG (OFFD(NY)) * A2) * CP(INDEX,NY)
      ELSE
        RHS(1) = CONJG (OFFD(1)) * (CP(INDEX,2) + CP0)
   &       + (1.0-2.0 * CONJG (OFFD(1))) * CP(INDEX,1)
        A2 = 2.0 * CP(INDEX,NY) * CONJG (CP(INDEX,NY-1))
        B2 = CP(INDEX,NY) * CONJG (CP(INDEX,NY))
   &       + CP(INDEX,NY-1) * CONJG (CP(INDEX,NY-1))
        IF(ABS (B2) .LE. EPS) THEN
          A2 = CMPLX (1.0, 0.0)
        ELSE
          A2 = A2 / B2
        END IF
        IF(AIMAG (A2) .LT. 0.0) A2 = CONJG (A2)
        DIAG(NY) = OFFD(NY) * A2 + DIAG(NY)
        RHS(NY) = CONJG (OFFD(NY)) * CP(INDEX,NY-1)
   &       + ((1.0-2.0 * CONJG (OFFD(NY)))
   &       + CONJG (OFFD(NY)) * A2) * CP(INDEX,NY)
      END IF
    END IF
  END IF
C   Finish the RHS: (The compiler needs to ignore this loop when
NY < 2.)
    CPJ = CP(INDEX,2)
    TEMP1 = CPJ - CP(INDEX,1)
    DO J = 2, NY - 1
      CPJP1 = CP(INDEX,J+1)
      TEMP2 = CPJP1 - CPJ
      RSH(J) = CPJ + CONJG(OFFD(J))*(TEMP2 - TEMP1)
      CPJ = CPJP1
      TEMP1 = TEMP2
    END DO
990 MSGID = MSGID + 2
    RETURN
    END
```

We claim:

1. A frequency domain method of processing seismic data, said seismic data corresponding to a subsurface region of the earth, said processing performed on a computer system having multiple processing elements, said method comprising the steps of:

a) specifying slices in said data;

b) assigning each of at least a plurality of said processing elements at least one partition on at least one of said slices, wherein said partition assignment for each of said plurality of said processing elements is independent of said partition assignment of each other of said plurality of said processing elements;

c) precomputing a velocity model corresponding to said subsurface region;

d) in each of said plurality of said processing elements, performing a direct migration of said partition in said element using said velocity model, said migration performed in the frequency domain, each of said plurality of said processing elements performing said migration independent of each other of said processing elements, said migration facilitated by Fourier transformation of each of two spatial parameters characterizing said seismic data into the wavenumber domain, each of said transformations performed by each of said plurality of processing elements independent of each other of said plurality of processing elements;

e) generating a map of reflectors in said seismic data using said migrated partitions.

2. The method of claim 1, wherein a) said seismic data is Fourier transformed from the time domain to the frequency domain and said slices are frequency slices in said transformed data;

b) said velocity model extends to a maximum depth of interest in said subsurface region and is subdivided into a family of velocity slices;

c) for each of said plurality of processing elements, broadcasting a first of said assigned partitions to said element;

d) said migration involves
   (i) broadcasting a first of said family of pre-computed velocity slices to each of said plurality of processing elements;
   (ii) downward continuing each said partition in each said element using said broadcast velocity slice, wherein said downward continuation involves a split wave equation solution technique in which a first of said two spatial parameters is solved for each said partition by said assigned processing element independent both of each other said partition and of each other said processing element; and
   (iii) repeating said velocity slice broadcasting and said downward continuing procedures until said maximum depth of interest has been attained;

e) repeating said partition broadcasting and said migration until all said partitions on all said slices have been migrated; and f) said map is a reflector depth map.

3. The method of claim 2 wherein, for a second of said two spatial parameters, said downward continuation involves for each said frequency slice a burn at both ends dual solution technique which allows simultaneous calculation by at least two processing elements for the solution of said split wave equation for said second spatial parameter for said slice.

4. The method of claim 2, wherein said downward continuation also involves an error correction calculation in the wavenumber domain.

5. The method of claim 4, wherein for each frequency slice said independent transforms are facilitated by at least one transpose of data for one of said spatial parameters between said processing elements which are assigned said partitions on said slice.

6. The method of claim 2, wherein said downward continuation also involves a wraparound filter calculation in the wavenumber domain.

7. The method of claim 6, wherein for each frequency slice said independent transforms are facilitated by at least one transpose of data for one of said spatial parameters between said processing elements which are assigned said partitions on said slice.

8. The method of claim 1, wherein a) said specified slices are time slices in said seismic data;

b) said velocity model involves a family of constant velocity layers, said model extending to a maximum depth of interest in said subsurface region, said family of layers communicated to each of said plurality of said processing elements;

c) for each of said plurality of processing elements, broadcasting a first of said assigned partitions to said element;

d) said migration involves, in each of said plurality of said processing elements,
   i) Fourier transforming said broadcast partitions from the time domain to the frequency domain, and
   ii) time migrating said transformed partition using said family of velocity layers until said maximum depth of interest has been attained;

e) repeating said migration until all said partitions on all said slices have been migrated; and f) said map is a reflector time map.

9. The method of claim 8, wherein said independent transforms are facilitated by at least one transpose of data between said processing elements which are assigned said partitions on said slice.

10. The method of claim 8, wherein said direct migration employs a phase shift downward continuation.

11. The method of claim 8, wherein said direct migration employs a recursive frequency—wavenumber downward continuation.

* * * * *